(12) United States Patent
Stoyles et al.

(10) Patent No.: US 12,535,982 B2
(45) Date of Patent: Jan. 27, 2026

(54) ACCESSING FUNCTIONS OF EXTERNAL DEVICES USING REALITY INTERFACES

(71) Applicant: Apple Inc., Cupertino, CA (US)

(72) Inventors: Justin D. Stoyles, San Francisco, CA (US); Michael Kuhn, Baierbrunn, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/811,647

(22) Filed: Aug. 21, 2024

(65) Prior Publication Data

US 2024/0411497 A1 Dec. 12, 2024

Related U.S. Application Data

(63) Continuation of application No. 18/229,059, filed on Aug. 1, 2023, now Pat. No. 12,099,773, which is a (Continued)

(51) Int. Cl.
*G06F 3/14* (2006.01)
*G02B 27/00* (2006.01)
(Continued)

(52) U.S. Cl.
CPC ....... *G06F 3/1423* (2013.01); *G02B 27/0093* (2013.01); *G02B 27/017* (2013.01);
(Continued)

(58) Field of Classification Search
CPC .................................................. G06F 3/1423
(Continued)

(56) References Cited

U.S. PATENT DOCUMENTS 5,664,133 A 9/1997 Malamud et al.
5,949,432 A 9/1999 Gough et al.
(Continued)

FOREIGN PATENT DOCUMENTS

CN 102843523 A 12/2012
CN 103164017 A 6/2013
(Continued)

OTHER PUBLICATIONS

Corrected Notice of Allowance received for U.S. Appl. No. 18/235,693, mailed on Feb. 20, 2025, 2 pages.
(Continued)

*Primary Examiner* — Long D Pham
(74) *Attorney, Agent, or Firm* — YHE Law LLP

(57) ABSTRACT

In an exemplary process, an electronic device obtains, from an external device, information specifying one or more available functions of the external device, and image data of a physical environment that includes the external device is captured by an image sensor. The electronic device then determines that the image data includes a representation of the external device, and in response, a display concurrently presents a view of the physical environment and a user-activatable virtual object corresponding to a first function of the one or more available functions of the external device, where the user-activatable virtual object is selected from a plurality of candidate user-activatable virtual objects based on the information specifying the one or more available functions of the external device.

18 Claims, 14 Drawing Sheets

Related U.S. Application Data continuation of application No. 17/534,102, filed on Nov. 23, 2021, now Pat. No. 11,762,620, which is a continuation of application No. 16/802,188, filed on Feb. 26, 2020, now Pat. No. 11,188,286, which is a continuation of application No. PCT/US2018/053415, filed on Sep. 28, 2018.

(60) Provisional application No. 62/734,678, filed on Sep. 21, 2018, provisional application No. 62/566,206, filed on Sep. 29, 2017, provisional application No. 62/566,080, filed on Sep. 29, 2017, provisional application No. 62/566,073, filed on Sep. 29, 2017.

(51) Int. Cl.

| | |
|---|---|
| *G02B 27/01* | (2006.01) |
| *G06F 3/01* | (2006.01) |
| *G06F 3/0346* | (2013.01) |
| *G06F 3/04815* | (2022.01) |
| *G06F 3/04842* | (2022.01) |
| *G06T 7/73* | (2017.01) |
| *G06T 19/00* | (2011.01) |
| *G06V 20/20* | (2022.01) |
| *G06V 40/20* | (2022.01) |
| *H04B 5/70* | (2024.01) |

(52) U.S. Cl.
CPC ............ *G06F 3/013* (2013.01); *G06F 3/017* (2013.01); *G06F 3/0346* (2013.01); *G06F 3/04815* (2013.01); *G06F 3/04842* (2013.01); *G06T 7/74* (2017.01); *G06T 19/006* (2013.01); *G06V 20/20* (2022.01); *G06V 40/20* (2022.01); *H04B 5/70* (2024.01); *G02B 2027/0187* (2013.01)

(58) Field of Classification Search
USPC .......................................................... 345/11
See application file for complete search history.

(56) References Cited

U.S. PATENT DOCUMENTS

| | | | |
|---|---|---|---|
| 8,408,706 | B2 | 4/2013 | Yahav |
| 9,007,301 | B1 | 4/2015 | Raffle et al. |
| 10,110,678 | B2 | 10/2018 | Hebsur et al. |
| 10,248,399 | B2 | 4/2019 | Yoon |
| 10,353,532 | B1 | 7/2019 | Holz et al. |
| 11,132,162 | B2 | 9/2021 | Bar-Zeev et al. |
| 11,550,444 | B2 | 1/2023 | Josephson et al. |
| 11,714,592 | B2 | 8/2023 | Bar-Zeev et al. |
| 2002/0113943 | A1 | 8/2002 | Trajkovic et al. |
| 2004/0150584 | A1 | 8/2004 | Chuman et al. |
| 2005/0175218 | A1 | 8/2005 | Vertegaal et al. |
| 2007/0162872 | A1 | 7/2007 | Hong et al. |
| 2008/0154494 | A1 | 6/2008 | Kato et al. |
| 2008/0181452 | A1 | 7/2008 | Kwon et al. |
| 2008/0211766 | A1 | 9/2008 | Westerman et al. |
| 2008/0307360 | A1 | 12/2008 | Chaudhri et al. |
| 2011/0037712 | A1 | 2/2011 | Kim et al. |
| 2011/0161890 | A1 | 6/2011 | Anderson et al. |
| 2012/0249416 | A1 | 10/2012 | Maciocci et al. |
| 2013/0007668 | A1* | 1/2013 | Liu .................... G06F 3/012 715/841 |
| 2013/0042296 | A1 | 2/2013 | Hastings et al. |
| 2013/0050258 | A1 | 2/2013 | Liu et al. |
| 2013/0050432 | A1 | 2/2013 | Perez et al. |
| 2013/0141419 | A1 | 6/2013 | Mount et al. |
| 2013/0241805 | A1 | 9/2013 | Gomez |
| 2013/0283208 | A1 | 10/2013 | Bychkov et al. |
| 2013/0328762 | A1 | 12/2013 | Mcculloch et al. |
| 2014/0043227 | A1 | 2/2014 | Skogoe et al. |
| 2014/0096076 | A1 | 4/2014 | Ashbrook et al. |
| 2014/0160001 | A1 | 6/2014 | Kinnebrew et al. |
| 2014/0184550 | A1 | 7/2014 | Hennessey et al. |
| 2014/0201844 | A1 | 7/2014 | Buck |
| 2014/0204002 | A1 | 7/2014 | Bennet et al. |
| 2014/0240471 | A1 | 8/2014 | Srinivasa et al. |
| 2014/0253592 | A1 | 9/2014 | Cho |
| 2014/0333666 | A1 | 11/2014 | Poulos et al. |
| 2015/0084857 | A1 | 3/2015 | Kimura |
| 2015/0100803 | A1 | 4/2015 | Chen et al. |
| 2015/0103149 | A1 | 4/2015 | McNamer et al. |
| 2015/0130716 | A1 | 5/2015 | Sridharan et al. |
| 2015/0138079 | A1 | 5/2015 | Lannsjö |
| 2015/0199005 | A1 | 7/2015 | Haddon |
| 2015/0205494 | A1 | 7/2015 | Scott et al. |
| 2015/0268821 | A1 | 9/2015 | Ramsby et al. |
| 2015/0293592 | A1 | 10/2015 | Cheong et al. |
| 2015/0317518 | A1 | 11/2015 | Fujimaki et al. |
| 2015/0317837 | A1 | 11/2015 | Sholudko et al. |
| 2015/0323990 | A1 | 11/2015 | Maltz |
| 2015/0347114 | A1 | 12/2015 | Yoon |
| 2015/0362729 | A1 | 12/2015 | Jang et al. |
| 2016/0005229 | A1* | 1/2016 | Lee .................... G06T 11/60 345/419 |
| 2016/0018645 | A1 | 1/2016 | Haddick et al. |
| 2016/0018654 | A1 | 1/2016 | Haddick et al. |
| 2016/0025981 | A1 | 1/2016 | Burns et al. |
| 2016/0026242 | A1 | 1/2016 | Burns et al. |
| 2016/0026253 | A1 | 1/2016 | Bradski et al. |
| 2016/0085301 | A1 | 3/2016 | Lopez |
| 2016/0116980 | A1 | 4/2016 | George-Svahn et al. |
| 2016/0179336 | A1 | 6/2016 | Ambrus et al. |
| 2016/0182877 | A1 | 6/2016 | Deluca |
| 2016/0241767 | A1 | 8/2016 | Cho et al. |
| 2016/0262614 | A1 | 9/2016 | Ninomiya et al. |
| 2016/0267708 | A1 | 9/2016 | Nistico et al. |
| 2016/0274762 | A1 | 9/2016 | Lopez et al. |
| 2016/0284123 | A1 | 9/2016 | Hare et al. |
| 2016/0292759 | A1 | 10/2016 | Gonzalez Miranda et al. |
| 2016/0295038 | A1 | 10/2016 | Rao et al. |
| 2016/0313875 | A1 | 10/2016 | Williams et al. |
| 2016/0371888 | A1 | 12/2016 | Wright et al. |
| 2016/0379418 | A1 | 12/2016 | Osborn et al. |
| 2017/0038829 | A1 | 2/2017 | Lanier et al. |
| 2017/0060230 | A1 | 3/2017 | Faaborg et al. |
| 2017/0078825 | A1 | 3/2017 | Mangiat et al. |
| 2017/0090566 | A1 | 3/2017 | George-Svahn et al. |
| 2017/0099481 | A1 | 4/2017 | Held et al. |
| 2017/0123491 | A1 | 5/2017 | Hansen et al. |
| 2017/0134553 | A1 | 5/2017 | Jeon et al. |
| 2017/0153701 | A1 | 6/2017 | Mahon et al. |
| 2017/0185156 | A1 | 6/2017 | Shotton et al. |
| 2017/0185276 | A1 | 6/2017 | Lee et al. |
| 2017/0194768 | A1 | 7/2017 | Powers et al. |
| 2017/0221276 | A1 | 8/2017 | Osborn et al. |
| 2017/0237974 | A1 | 8/2017 | Samec et al. |
| 2017/0285737 | A1 | 10/2017 | Khalid et al. |
| 2017/0318019 | A1 | 11/2017 | Gordon et al. |
| 2018/0004283 | A1 | 1/2018 | Mathey-Owens et al. |
| 2018/0054487 | A1 | 2/2018 | Hebsur et al. |
| 2018/0081171 | A1 | 3/2018 | Park et al. |
| 2018/0095635 | A1 | 4/2018 | Valdivia et al. |
| 2018/0096202 | A1 | 4/2018 | Stathacopoulos et al. |
| 2018/0204385 | A1 | 7/2018 | Sarangdhar et al. |
| 2018/0249086 | A1 | 8/2018 | Ozawa et al. |
| 2019/0025910 | A1 | 1/2019 | Gilra |
| 2019/0122420 | A1 | 4/2019 | Terahata |
| 2019/0244416 | A1 | 8/2019 | Tamaoki et al. |
| 2019/0318660 | A1 | 10/2019 | Kimoto |
| 2019/0378423 | A1 | 12/2019 | Bachrach et al. |
| 2020/0192622 | A1 | 6/2020 | Stoyles et al. |
| 2020/0201444 | A1 | 6/2020 | Stoyles et al. |
| 2020/0225746 | A1 | 7/2020 | Bar-Zeev et al. |
| 2020/0225747 | A1 | 7/2020 | Bar-Zeev et al. |
| 2020/0301553 | A1 | 9/2020 | Taylor et al. |
| 2021/0096726 | A1 | 4/2021 | Faulkner et al. |
| 2021/0097776 | A1 | 4/2021 | Faulkner et al. |
| 2021/0240331 | A1 | 8/2021 | Olson et al. |
| 2021/0365228 | A1 | 11/2021 | Stoyles et al. |
| 2022/0012002 | A1 | 1/2022 | Bar-Zeev et al. |

(56) References Cited

U.S. PATENT DOCUMENTS

| | | | |
|---|---|---|---|
| 2022/0083303 | A1 | 3/2022 | Stoyles et al. |
| 2022/0245900 | A1 | 8/2022 | Tan et al. |
| 2023/0325140 | A1 | 10/2023 | Bar-Zeev et al. |
| 2023/0376261 | A1 | 11/2023 | Stoyles et al. |
| 2023/0393796 | A1 | 12/2023 | Stoyles et al. |
| 2024/0103614 | A1 | 3/2024 | Dryer et al. |
| 2024/0104871 | A1 | 3/2024 | Brewer et al. |
| 2025/0103133 | A1 | 3/2025 | Vicente et al. |
| 2025/0190161 | A1 | 6/2025 | Stoyles et al. |

FOREIGN PATENT DOCUMENTS

| | | |
|---|---|---|
| CN | 103460256 A | 12/2013 |
| CN | 103765346 A | 4/2014 |
| CN | 104516497 A | 4/2015 |
| CN | 105009039 A | 10/2015 |
| CN | 105393190 A | 3/2016 |
| CN | 105493501 A | 4/2016 |
| CN | 106164818 A | 11/2016 |
| CN | 106371206 A | 2/2017 |
| CN | 106415444 A | 2/2017 |
| CN | 106462231 A | 2/2017 |
| CN | 106462733 A | 2/2017 |
| CN | 106951069 A | 7/2017 |
| CN | 107003521 A | 8/2017 |
| EP | 0513584 A2 | 11/1992 |
| EP | 1055200 B1 | 5/2003 |
| EP | 2940556 A1 | 11/2015 |
| EP | 2947546 A1 | 11/2015 |
| EP | 3118722 A1 | 1/2017 |
| JP | 2004-37149 A | 2/2004 |
| JP | 2004-513403 A | 4/2004 |
| JP | 2004-517359 A | 6/2004 |
| JP | 2005-157329 A | 6/2005 |
| JP | 2008-158583 A | 7/2008 |
| JP | 2009-64395 A | 3/2009 |
| JP | 2012-221498 A | 11/2012 |
| JP | 2015-90635 A | 5/2015 |
| JP | 2015-126857 A | 7/2015 |
| JP | 2016-502120 A | 1/2016 |
| JP | 2016-85588 A | 5/2016 |
| JP | 2016-192132 A | 11/2016 |
| KR | 10-2002-0086590 A | 11/2002 |
| KR | 10-2007-0067332 A | 6/2007 |
| KR | 10-2015-0125472 A | 11/2015 |
| WO | 2013/144807 A1 | 10/2013 |
| WO | 2014/033306 A1 | 3/2014 |
| WO | 2014/204755 A1 | 12/2014 |
| WO | 2015/110852 A1 | 7/2015 |
| WO | 2015/140106 A1 | 9/2015 |
| WO | 2015/142966 A1 | 9/2015 |
| WO | 2016/045784 | 3/2016 |
| WO | 2016/099706 A1 | 6/2016 |
| WO | 2017/031089 A1 | 2/2017 |
| WO | 2017/096097 A1 | 6/2017 |
| WO | 20171/12692 A2 | 6/2017 |
| WO | 2023/049170 A2 | 3/2023 |

OTHER PUBLICATIONS

Non-Final Office Action received for U.S. Appl. No. 18/209,931, mailed on Oct. 22, 2024, 18 pages.
Notice of Allowance received for Korean Patent Application No. 10-2023-7022376, mailed on Oct. 21, 2024, 7 pages (2 pages of English Translation and 5 pages of Official Copy).
Chatterjee et al., "Gaze+Gesture: Expressive, Precise and Targeted Free-Space Interactions", ICMI '15: Proceedings of the 2015 ACM on International Conference on Multimodal Interaction, online available at: https://dl.acm.org/doi/10.1145/2818346.2820752, Nov. 9-13, 2015, pp. 131-138.
Extended European Search Report received for European Patent Application No. 23219457.1, mailed on Apr. 16, 2024, 10 pages.
International Search Report and Written Opinion received for PCT Patent Application No. PCT/US2023/033501, mailed on Feb. 26, 2024, 21 pages.
International Search Report and Written Opinion received for PCT Patent Application No. PCT/US2023/033549, mailed on Jan. 15, 2024, 15 pages.
Invitation to Pay Additional Fees and Partial International Search Report received for PCT Patent Application No. PCT/US2023/033501, mailed on Jan. 5, 2024, 15 pages.
Non-Final Office Action received for U.S. Appl. No. 18/235,693, mailed on Jul. 3, 2024, 25 pages.
Notice of Allowance received for U.S. Appl. No. 18/235,693, mailed on Aug. 28, 2024, 11 pages.
Office Action received for Chinese Patent Application No. 202210616910.7, mailed on Aug. 8, 2024, 19 pages (10 pages of English Translation and 9 pages of Official Copy).
Office Action received for Chinese Patent Application No. 202210618012.5, mailed on Aug. 9, 2024, 16 pages (9 pages of English Translation and 7 pages of Official Copy).
Office Action received for Japanese Patent Application No. 2023-149802, mailed on Jul. 29, 2024, 2 pages (1 page of English Translation and 1 page of Official Copy).
Applicant-Initiated Interview Summary received for U.S. Appl. No. 18/209,931, mailed on Feb. 3, 2025, 4 pages.
International Preliminary Report on Patentability received for PCT Patent Application No. PCT/US2023/033501, mailed on Apr. 3, 2025, 16 pages.
International Preliminary Report on Patentability received for PCT Patent Application No. PCT/US2023/033549, mailed on Apr. 3, 2025, 10 pages.
International Search Report and Written Opinion received for PCT Patent Application No. PCT/US2024/045209, mailed on Jan. 31, 2025, 14 pages.
Invitation to Pay Additional Fees and Partial International Search Report received for PCT Patent Application No. PCT/US2024/045209, mailed on Dec. 10, 2024, 11 pages.
Non-Final Office Action received for U.S. Appl. No. 18/209,931, mailed on Apr. 10, 2025, 7 pages.
Notice of Allowance received for Chinese Patent Application No. 202210618012.5, mailed on Jan. 1, 2025, 5 pages (1 page of English Translation and 4 pages of Official Copy).
Applicant-Initiated Interview Summary received for U.S. Appl. No. 18/209,931, mailed on Nov. 27, 2024, 2 pages.
Decision to Grant received for Japanese Patent Application No. 2023-149802, mailed on Dec. 3, 2024, 3 pages (1 page of English Translation and 2 pages of Official Copy).
Final Office Action received for U.S. Appl. No. 18/209,931, mailed on Dec. 13, 2024, 23 pages.
Notice of Allowance received for U.S. Appl. No. 18/235,693, mailed on Dec. 13, 2024, 10 pages.
Office Action received for Chinese Patent Application No. 202210616910.7, mailed on Nov. 22, 2024, 17 pages (9 pages of English Translation and 8 pages of Official Copy).
Applicant-Initiated Interview Summary received for U.S. Appl. No. 16/802,188, mailed on Mar. 23, 2021, 2 pages.
Applicant-Initiated Interview Summary received for U.S. Appl. No. 16/802,320, mailed on Apr. 9, 2021, 2 pages.
Applicant-Interview Summary received for U.S. Appl. No. 16/828,852, mailed on Jan. 27, 2021, 4 pages.
Applicant-Interview Summary received for U.S. Appl. No. 16/828,852, mailed on Jun. 8, 2021, 2 pages.
Applicant-Interview Summary received for U.S. Appl. No. 16/828,857, mailed on Jun. 10, 2021, 3 pages.
Applicant-Interview Summary received for U.S. Appl. No. 17/052,081, mailed on Oct. 18, 2021, 4 pages.
Applicant-Interview Summary received for U.S. Appl. No. 17/486,646, mailed on Aug. 23, 2022, 2 pages.
Applicant-Interview Summary received for U.S. Appl. No. 17/486,646, mailed on Dec. 28, 2022, 2 pages.
Applicant-Interview Summary received for U.S. Appl. No. 17/534,102, mailed on Sep. 27, 2022, 2 pages.
Applicant-Interview Summary received for U.S. Appl. No. 18/229,059, mailed on Apr. 26, 2024, 2 pages.

(56) References Cited

OTHER PUBLICATIONS

Brief Communication regarding Oral Proceedings received for European Patent Application No. 18786644.7, mailed on Feb. 27, 2023, 3 pages.
Businesswire, "SMI Gaze Interaction Powers Google Glass Prototype", Online Available at: https://www.youtube.com/watch?v=R3xxqap7DmQ&t=1s, Mar. 3, 2015, 3 pages.
Corrected Notice of Allowance received for U.S. Appl. No. 16/828,857, mailed on Sep. 1, 2021, 3 pages.
Corrected Notice of Allowance received for U.S. Appl. No. 17/394,114, mailed on Jun. 14, 2023, 2 pages.
Decision of Rejection received for Japanese Patent Application No. 2021-142308, mailed on May 15, 2023, 4 pages.
Decision to Grant received for Japanese Patent Application No. 2020-512573, mailed on Aug. 2, 2021, 3 pages.
Decision to Refuse received for European Patent Application No. 18786644.7, mailed on Mar. 27, 2023, 9 pages.
Extended European Search Report received for European Patent Application No. 23173161.3, mailed on Oct. 30, 2023, 9 pages.
Final Office Action received for U.S. Appl. No. 16/802,188, mailed on May 14, 2021, 18 pages.
Final Office Action received for U.S. Appl. No. 16/828,852, mailed on Mar. 9, 2021, 16 pages.
Final Office Action received for U.S. Appl. No. 17/486,646, mailed on Oct. 5, 2022, 20 pages.
Final Office Action received for U.S. Appl. No. 17/534,102, mailed on Nov. 30, 2022, 14 pages.
Howmuchtech, "5 Best Smart Glasses of 2022", Online Available at: https://www.youtube.com/watch?v=xll2Ycc6Fv0&t=162s, Dec. 24, 2021, 6 pages.
International Preliminary Report on Patentability received for PCT Patent Application No. PCT/US2018/053415, mailed on Apr. 9, 2020, 10 pages.
International Preliminary Report on Patentability received for PCT Patent Application No. PCT/US2018/053422, mailed on Apr. 9, 2020, 10 pages.
International Preliminary Report on Patentability received for PCT Patent Application No. PCT/US2018/053427, mailed on Apr. 9, 2020, 14 pages.
International Preliminary Report on Patentability received for PCT Patent Application No. PCT/US2018/053428, mailed on Apr. 9, 2020, 8 pages.
International Preliminary Report on Patentability received for PCT Patent Application No. PCT/US2019/028980, mailed on Nov. 19, 2020, 10 pages.
International Search Report and Written Opinion received for PCT Patent Application No. PCT/US2018/053415, mailed on Dec. 13, 2018, 14 pages.
International Search Report and Written Opinion received for PCT Patent Application No. PCT/US2018/053422, mailed on Dec. 19, 2018, 13 pages.
International Search Report and Written Opinion received for PCT Patent Application No. PCT/US2018/053427, mailed on Mar. 25, 2019, 18 pages.
International Search Report and Written Opinion received for PCT Patent Application No. PCT/US2018/053428, mailed on Jan. 25, 2019, 9 pages.
International Search Report and Written Opinion received for PCT Patent Application No. PCT/US2019/028980, mailed on Aug. 16, 2019, 14 pages.
Invitation to Pay Additional Fees received for PCT Patent Application No. PCT/US2018/053427, mailed on Feb. 1, 2019, 13 pages.
Kunhee et al., "Distant 3D Object Grasping with Gaze-supported Selection", The 12th International Conference on Ubiquitous Robots and Ambient Intelligence (URAI 2015), Oct. 28-30, 2015, pp. 541-544.
Liu et al., "Video avatar-based remote video collaboration", Journal of Beijing University of Aeronautics and Astronautics, vol. 41, No. 6, Jun. 2015, pp. 1087-1094.
Minutes of the Oral Proceedings received for European Patent Application No. 18786644.7, mailed on Mar. 24, 2023, 5 pages.
Non-Final Office Action received for U.S. Appl. No. 16/802,188, mailed on Dec. 16, 2020, 15 pages.
Non-Final Office Action received for U.S. Appl. No. 16/802,320, mailed on Dec. 24, 2020, 19 pages.
Non-Final Office Action received for U.S. Appl. No. 16/828,852, mailed on Nov. 9, 2020, 14 pages.
Non-Final Office Action received for U.S. Appl. No. 16/828,857, mailed on Feb. 17, 2021, 12 pages.
Non-Final Office Action received for U.S. Appl. No. 17/052,081, mailed on Jul. 14, 2021, 16 pages.
Non-Final Office Action received for U.S. Appl. No. 17/394,114, mailed on Jul. 6, 2022, 17 pages.
Non-Final Office Action received for U.S. Appl. No. 17/486,646, mailed on Jun. 15, 2022, 17 pages.
Non-Final Office Action received for U.S. Appl. No. 17/534,102, mailed on Jul. 7, 2022, 14 pages.
Non-Final Office Action received for U.S. Appl. No. 18/229,059, mailed on Mar. 7, 2024, 15 pages.
Notice of Allowance received for Chinese Patent Application No. 201880051530.5, mailed on Apr. 8, 2022, 5 pages.
Notice of Allowance received for Chinese Patent Application No. 201880052303.4, mailed on Mar. 9, 2022, 4 pages.
Notice of Allowance received for Chinese Patent Application No. 201880055893.6, mailed on Mar. 30, 2022, 4 pages.
Notice of Allowance received for Chinese Patent Application No. 201980028660.1, mailed on Feb. 27, 2024, 2 pages.
Notice of Allowance received for Korean Patent Application No. 10-2020-7006018, mailed on Apr. 18, 2022, 4 pages.
Notice of Allowance received for U.S. Appl. No. 16/802,188, mailed on Jul. 29, 2021, 8 pages.
Notice of Allowance received for U.S. Appl. No. 16/802,320, mailed on Apr. 30, 2021, 9 pages.
Notice of Allowance received for U.S. Appl. No. 16/828,852, mailed on Jul. 27, 2021, 10 pages.
Notice of Allowance received for U.S. Appl. No. 16/828,857, mailed on Jul. 14, 2021, 6 pages.
Notice of Allowance received for U.S. Appl. No. 17/052,081, mailed on Jan. 14, 2022, 7 pages.
Notice of Allowance received for U.S. Appl. No. 17/394,114, mailed on Feb. 7, 2023, 10 pages.
Notice of Allowance received for U.S. Appl. No. 17/394,114, mailed on Jun. 2, 2023, 11 pages.
Notice of Allowance received for U.S. Appl. No. 17/394,114, mailed on Oct. 21, 2022, 10 pages.
Notice of Allowance received for U.S. Appl. No. 17/486,646, mailed on Mar. 22, 2023, 9 pages.
Notice of Allowance received for U.S. Appl. No. 17/534,102, mailed on Jan. 11, 2023, 8 pages.
Notice of Allowance received for U.S. Appl. No. 17/534,102, mailed on May 2, 2023, 8 pages.
Notice of Allowance received for U.S. Appl. No. 18/229,059, mailed on Jul. 11, 2024, 7 pages.
Office Action received for Chinese Patent Application No. 201880051530.5, mailed on Sep. 6, 2021, 18 pages.
Office Action received for Chinese Patent Application No. 201880052303.4, mailed on Sep. 27, 2021, 20 pages.
Office Action received for Chinese Patent Application No. 201880055893.6, mailed on Sep. 6, 2021, 21 pages.
Office Action received for Chinese Patent Application No. 201980028660.1, mailed on Oct. 18, 2023, 11 pages.
Office Action received for European Patent Application No. 18786644.7, mailed on Apr. 28, 2021, 6 pages.
Office Action received for Japanese Patent Application No. 2020-512573, mailed on Apr. 12, 2021, 7 pages.
Office Action received for Japanese Patent Application No. 2021-142308, mailed on Oct. 31, 2022, 10 pages.
Office Action received for Korean Patent Application No. 10-2020-7006018, mailed on Oct. 9, 2021, 9 pages.
Office Action received for Korean Patent Application No. 10-2022-7022762, mailed on Apr. 11, 2023, 8 pages.

(56) References Cited

OTHER PUBLICATIONS

Office Action received for Korean Patent Application No. 10-2022-7022762, mailed on Jan. 27, 2023, 6 pages.
Office Action received for Korean Patent Application No. 10-2022-7022762, mailed on Jul. 19, 2022, 9 pages.
Office Action received for Korean Patent Application No. 10-2023-7022376, mailed on Jan. 30, 2024, 9 pages.
Office Action received for Korean Patent Application No. 10-2023-7022376, mailed on Jul. 26, 2023, 9 pages.
Special Effect, "Open Drive—Eye Gaze Games | Eye Gaze Controls & Options", Online Available at: https://www.youtube.com/watch?v=IJi2aOdSau8&t=63s, Mar. 18, 2022, 3 pages.
Stellmach et al., "Look & Touch: Gaze-supported Target Acquisition", CHI'12: Proceedings of the SIGGHI Conference on Human Factors in Computing Systems; Available online at: https://dl.acm.org/doi/10.1145/2207676.2208709, May 5-10, 2012, pp. 2981-2990.
Stellmach et al., "Still Looking: Investigating Seamless Gaze-supported Selection, Positioning, and Manipulation of Distant Targets", CHI'13: Proceedings of the SIGCHI Conference on Human Factors in Computing Systems; Available online at: https://dl.acm.org/doi/10.1145/2470654.2470695, Apr. 27-May 2, 2013, pp. 285-294.
Summons to Attend Oral Proceedings received for European Patent Application No. 18786644.7, mailed on Nov. 10, 2022, 5 pages.
Takase et al., "Gestural Interface and the Intuitive Interaction with Virtual Objects", ICROS-SICE International Joint Conference, 2009, pp. 3260-3263.
Wang Zichuan, "Transmissive smart glasses based on image recognition and gesture tracking", Innovation Technology Frontier, pp. 26-28.
Notice of Allowance received for U.S. Appl. No. 18/209,931, mailed on Jul. 22, 2025, 16 pages.
Notice of Allowance received for U.S. Appl. No. 18/370,363, mailed on Jul. 29, 2025, 9 pages.
Corrected Notice of Allowance received for U.S. Appl. No. 18/209,931, mailed on Aug. 5, 2025, 2 pages.
Notice of Allowance received for U.S. Appl. No. 18/370,847, mailed on Aug. 5, 2025, 9 pages.
Notice of Allowance received for U.S. Appl. No. 18/209,931, mailed on May 21, 2025, 16 pages.
Notice of Allowance received for U.S. Appl. No. 18/370,363, mailed on May 29, 2025, 14 pages.
Corrected Notice of Allowance received for U.S. Appl. No. 18/370,363, mailed on Aug. 26, 2025, 2 pages.

* cited by examiner

ACCESSING FUNCTIONS OF EXTERNAL DEVICES USING REALITY INTERFACES

CROSS-REFERENCE TO RELATED APPLICATIONS

This application is a continuation of U.S. patent application Ser. No. 18/229,059, entitled "ACCESSING FUNCTIONS OF EXTERNAL DEVICES USING REALITY INTERFACES," filed Aug. 1, 2023 (now U.S. Pat. No. 12,099,773), which is a continuation of U.S. patent application Ser. No. 17/534,102, entitled "Accessing Functions of External Devices Using Reality Interfaces," filed Nov. 23, 2021 (now U.S. Pat. No. 11,762,620), which is a continuation of U.S. patent application Ser. No. 16/802,188, now U.S. Pat. No. 11,188,286, entitled "Accessing Functions of External Devices Using Reality Interfaces," filed Feb. 26, 2020, which is a continuation of PCT Application No. PCT/US2018/053415, entitled "Accessing Functions of External Devices Using Reality Interfaces," filed Sep. 28, 2018, which claims priority from U.S. patent application Ser. No. 62/734,678, entitled "Gaze-Based User Interactions," filed Sep. 21, 2018; U.S. patent application Ser. No. 62/566,073, entitled "Accessing Functions of External Devices Using Reality Interfaces," filed Sep. 29, 2017; U.S. patent application Ser. No. 62/566,080, entitled "Controlling External Devices Using Reality Interfaces," filed Sep. 29, 2017; and U.S. patent application Ser. No. 62/566,206, entitled "Gaze-Based User Interactions," filed Sep. 29, 2017, which are each hereby incorporated by reference in their entirety.

FIELD

The present disclosure relates generally to reality interfaces, and more specifically to techniques for accessing a function of an external device using a reality interface.

BRIEF SUMMARY

Techniques for interacting with external devices while using a computer-generated reality system, such as a virtual reality or mixed reality system, are desirable. The present disclosure describes techniques for accessing a function of an external device using a computer-generated reality interface (also referred to herein as a reality interface). In some exemplary processes, one or more external devices are detected. Image data of a physical environment captured by an image sensor is obtained. The process determines whether the image data includes a representation of a first external device of the one or more detected external devices. In accordance with determining that the image data includes a representation of the first external device, the process causing a display to concurrently display a representation of the physical environment according to the image data, and an affordance corresponding to a function of the first external device, wherein detecting user activation of the displayed affordance causes the first external device to perform an action corresponding to the function.

DETAILED DESCRIPTION

Figure 1A:
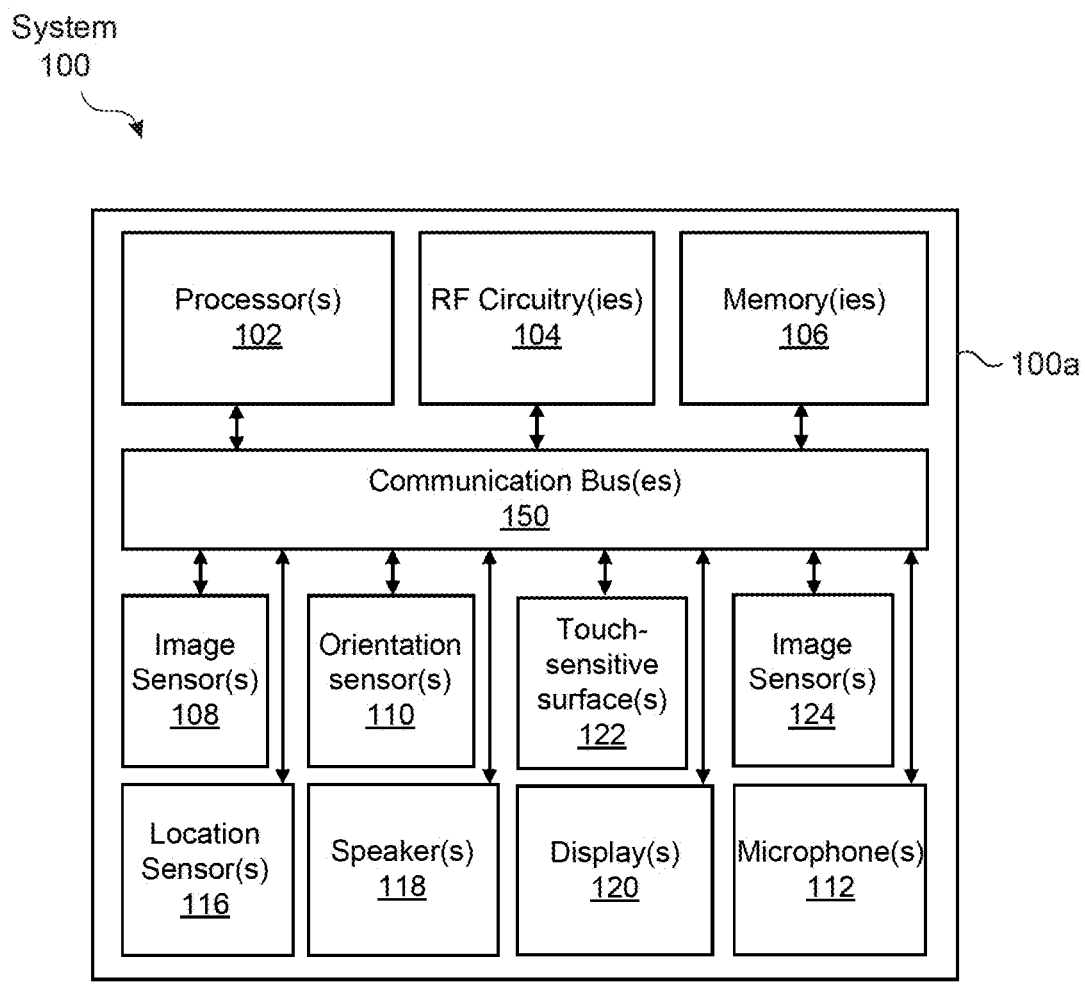
FIGS. 1A-1B depict exemplary systems for use in various computer-generated reality technologies, including virtual reality and mixed reality.

Various embodiments of electronic systems and techniques for using such systems in relation to various computer-generated reality technologies, including virtual reality and mixed reality (which incorporates sensory inputs from a physical environment), are described.

A computer-generated reality environment (e.g., virtual reality or mixed reality environment) can have varying degrees of virtual content and/or physical content. A computer-generated reality environment can provide an intuitive interface for a user to interact with his/her physical environment. For example, using a reality interface that displays a representation of the user's physical environment, a user can access the functions of one or more external devices in the physical environment. Specifically, using the reality interface, the user can access information (e.g., operating status) regarding the one or more external devices or control a function of the one or more external devices. One challenge for implementing such an application is accurately and efficiently mapping the one or more external devices in the physical environment to one or more respective representative objects in the reality interface. Specifically, the user device providing the reality interface would need to recognize that a particular object represented in the reality interface corresponds to a respective external device detected in the physical environment. In addition, the user device would need to identify the specific external devices that the user wishes to access and display appropriate control objects in the reality interface for accessing the functions of those external devices.

In accordance with some embodiments described herein, one or more external devices of a physical environment are detected. Image data of the physical environment captured by an image sensor is obtained. A determination is made as to whether the image data includes a representation of a first external device of the one or more detected external devices. The determination is made using one or more techniques, such as image recognition, three-dimensional object recognition, and location recognition. By applying these techniques, an object represented in the image data can be associated with the first external device. In accordance with determining that the image data includes a representation of the first external device, a representation of the physical environment and an affordance corresponding to a function of the first external device are concurrently displayed. The displayed affordance is configured such that user activation of the affordance causes the first external device to perform an action corresponding to the function.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
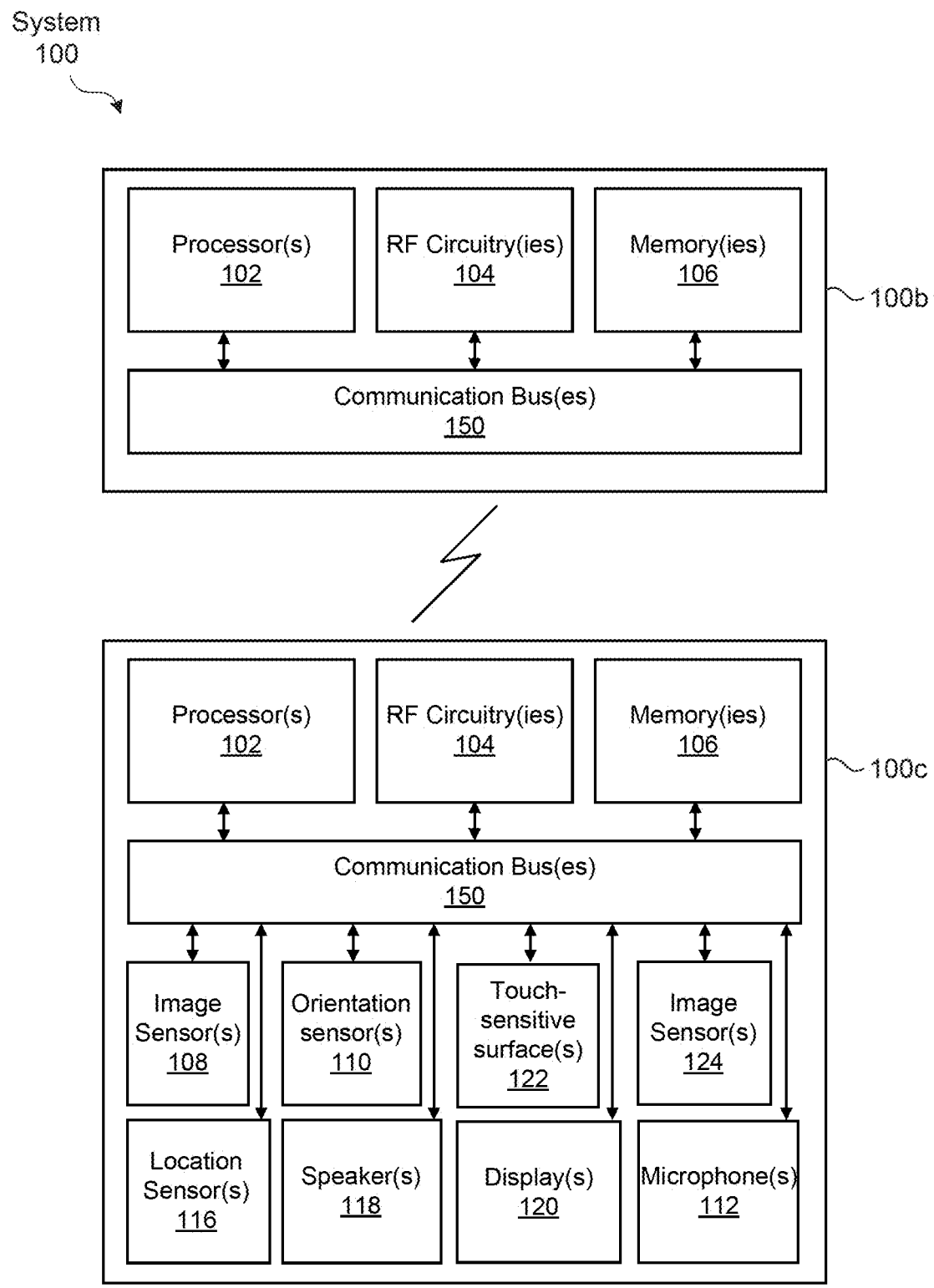

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory (ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry (ies) 104, and memory (ies) 106. These components optionally communicate over communication bus(es) 150 of device 100b. Second device 100c (e.g., a head-mounted device) includes various components, such as processor(s) 102, RF circuitry (ies) 104, memory (ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

Figure 1C:
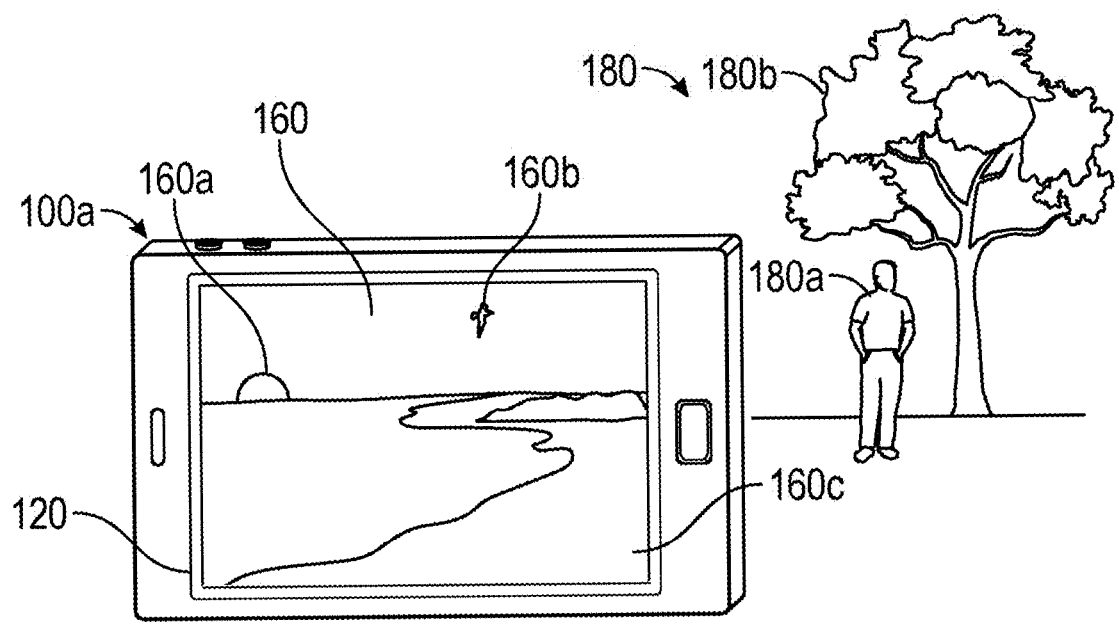
FIGS. 1C-1E illustrate examples of the system in the form of mobile devices.
Figure 1D:
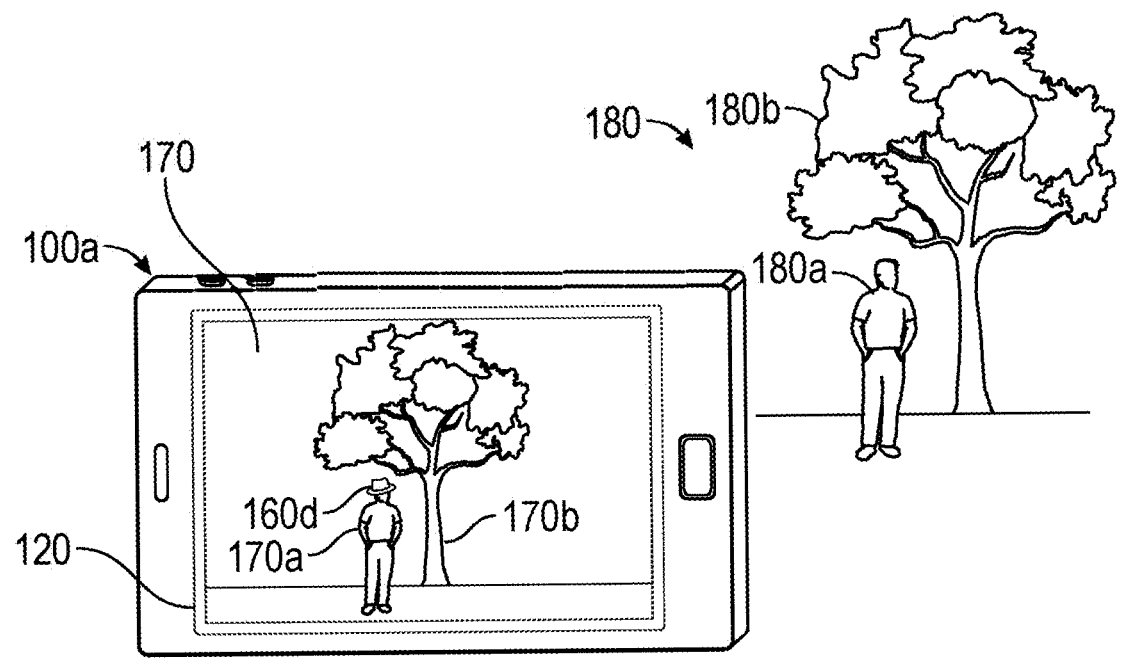
Figure 1E:
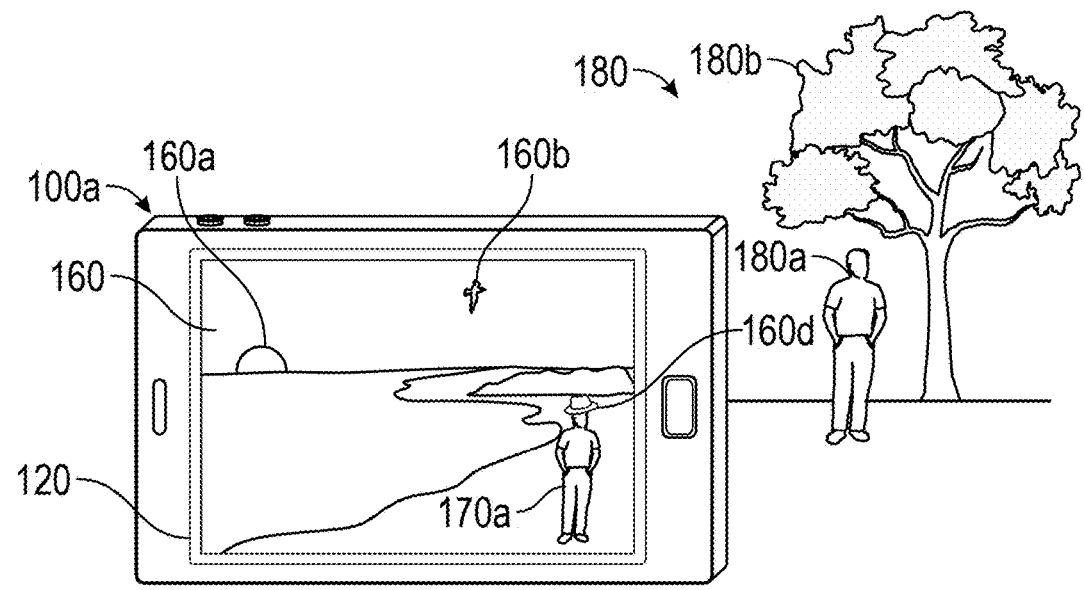

In some embodiments, system 100 is a mobile device, such as in the embodiments described with respect to device 100a in FIGS. 1C-1E. In some embodiments, system 100 is a head-mounted display (HMD) device, such as in the embodiments described with respect to device 100a in FIGS. 1F-1H. In some embodiments, system 100 is a wearable HUD device, such as in the embodiments described with respect to device 100a in FIG. 1I.

System 100 includes processor(s) 102 and memory (ies) 106. Processor(s) 102 include one or more general processors, one or more graphics processors, and/or one or more digital signal processors. In some embodiments, memory (ies) 106 are one or more non-transitory computer-readable storage mediums (e.g., flash memory, random access memory) that store computer-readable instructions configured to be executed by processor(s) 102 to perform the techniques described below.

System 100 includes RF circuitry (ies) 104. RF circuitry (ies) 104 optionally include circuitry for communicating with electronic devices, networks, such as the Internet, intranets, and/or a wireless network, such as cellular networks and wireless local area networks (LANs). RF circuitry (ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 optionally includes image sensor(s) 124. Image sensor(s) 124 are similar to image sensors(s) 108, except that image sensor(s) 124 are oriented in a direction opposite to image sensor(s) 108. For example, image sensor(s) 108 and image sensor(s) 124 are disposed on opposite sides of device 100*a* or 100*c*. In some embodiments, image sensor(s) 124 obtain images of the user while image sensor(s) 108 obtain images of physical objects in the user's line-of-sight.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate examples of system 100 in the form of device 100*a*. In FIGS. 1C-1E, device 100*a* is a mobile device, such as a cellular phone. FIG. 1C illustrates device 100*a* carrying out a virtual reality technique. Device 100*a* is displaying, on display 120, a virtual environment 160 that includes virtual objects, such as sun 160*a*, birds 160*b*, and beach 160*c*. Both the displayed virtual environment 160 and virtual objects (e.g., 160*a*, 160*b*, 160*c*) of the virtual environment 160 are computer-generated imagery. Note that the virtual reality environment depicted in FIG. 1C does not include representations of physical objects from the real environment 180, such as physical person 180*a* and physical tree 180*b*, even though these elements of real environment 180 are within the field of view of image sensor(s) 108 of device 100*a*.

FIG. 1D illustrates device 100*a* carrying out a mixed reality technique, and in particular an augmented reality technique, using pass-through video. Device 100*a* is displaying, on display 120, a representation 170 of the real environment 180 with virtual objects. The representation 170 of the real environment 180 includes representation 170*a* of person 180*a* and representation 170*b* of tree 180*b*. For example, the device uses image sensor(s) 108 to capture images of the real environment 180 that are passed through for display on display 120. Device 100*a* overlays hat 160*d*, which is a virtual object generated by device 100*a*, on the head of the representation 170*a* of person 180*a*. Device 100*a* tracks the location and/or orientation of physical objects with respect to the position and/or orientation of device 100*a* to enable virtual objects to interact with physical objects from the real environment in the augmented reality environment. In this example, device 100*a* accounts for movements of device 100*a* and person 180*a* to display hat 160*d* as being on the head of the representation 170*a* of person 180*a*, even as device 100*a* and person 180*a* move relative to one another.

FIG. 1E illustrates device 100*a* carrying out a mixed reality technique, and in particular an augmented virtuality technique. Device 100*a* is displaying, on display 120, a virtual environment 160 with representations of physical objects. The virtual environment 160 includes virtual objects (e.g., sun 160*a*, birds 160*b*) and representation 170*a* of person 180*a*. For example, device 100*a* uses image sensor(s) 108 to capture images of person 180*a* in real environment 180. Device 100*a* places representation 170*a* of person 180*a* in virtual environment 160 for display on display 120. Device 100*a* optionally tracks the location and/or orientation of physical objects with respect to the position and/or orientation of device 100*a* to enable virtual objects to interact with physical objects from real environment 180. In this example, device 100*a* accounts for movements of device 100*a* and person 180*a* to display hat 160*d* as being on the head of representation 170*a* of person 180*a*. Notably, in this example, device 100*a* does not display a representation of tree 180*b* even though tree 180*b* is also within the field of view of the image sensor(s) of device 100*a*, in carrying out the mixed reality technique.

Figure 1F:
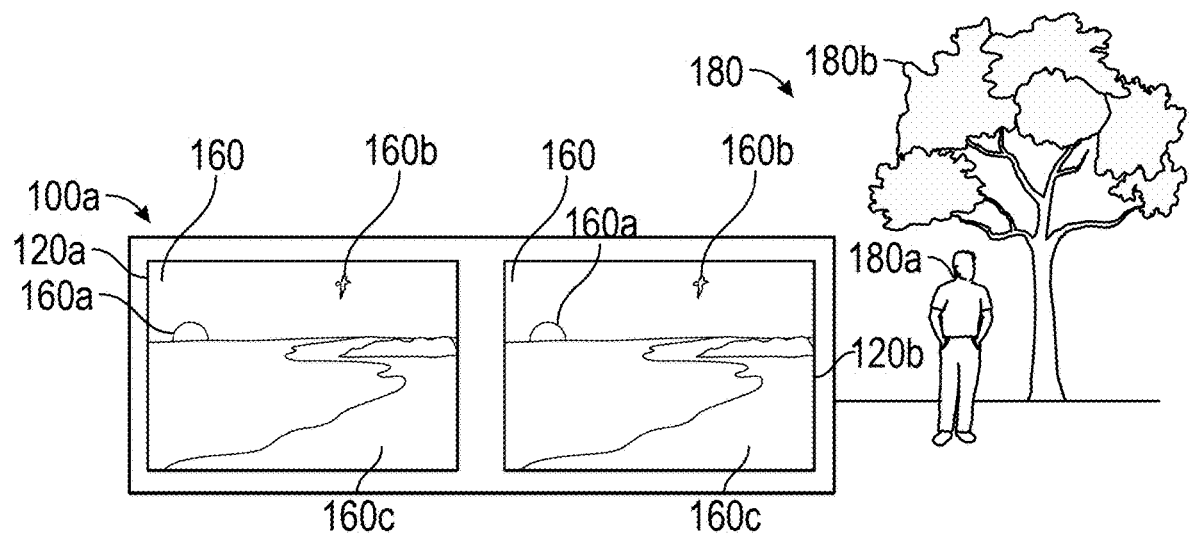
FIGS. 1F-1H illustrate examples of the system in the form of head-mounted display devices.
Figure 1G:
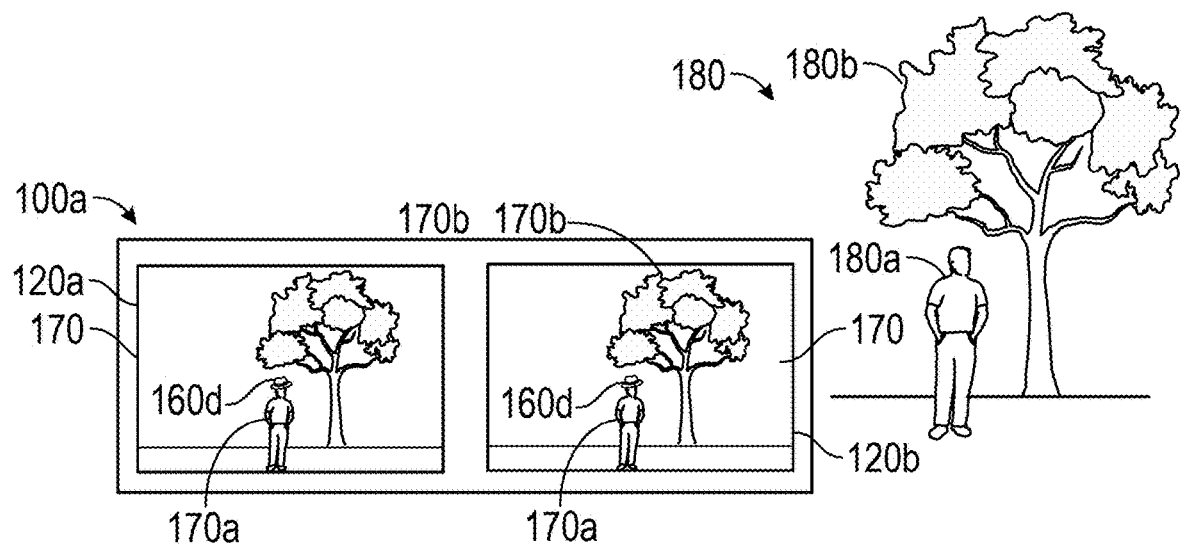
Figure 1H:
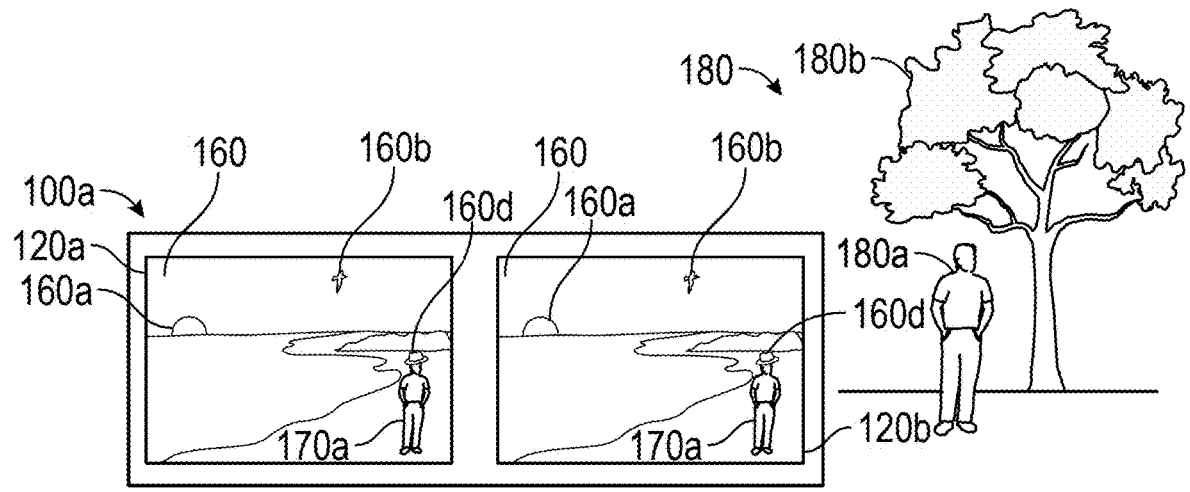

FIGS. 1F-1H illustrate examples of system 100 in the form of device 100*a*. In FIGS. 1F-1H, device 100*a* is a HMD device configured to be worn on the head of a user, with each eye of the user viewing a respective display 120*a* and 120*b*. FIG. 1F illustrates device 100*a* carrying out a virtual reality technique. Device 100*a* is displaying, on displays 120*a* and 120*b*, a virtual environment 160 that includes virtual objects, such as sun 160*a*, birds 160*b*, and beach 160*c*. The displayed virtual environment 160 and virtual objects (e.g., 160*a*, 160*b*, 160*c*) are computer-generated imagery. In this example, device 100*a* simultaneously displays corresponding images on display 120*a* and display 120*b*. The corresponding images include the same virtual environment 160 and virtual objects (e.g., 160*a*, 160*b*, 160*c*) from different viewpoints, resulting in a parallax effect that provides a user with the illusion of depth of the objects on the displays. Note that the virtual reality environment depicted in FIG. 1F does not include representations of physical objects from the real environment, such as person 180*a* and tree 180*b* even though person 180*a* and tree 180*b* are within the field of view of the image sensor(s) of device 100*a*, in carrying out the virtual reality technique.

FIG. 1G illustrates device 100*a* carrying out an augmented reality technique using pass-through video. Device 100*a* is displaying, on displays 120*a* and 120*b*, a representation 170 of real environment 180 with virtual objects. The representation 170 of real environment 180 includes representation 170*a* of person 180*a* and representation 170*b* of tree 180*b*. For example, device 100*a* uses image sensor(s) 108 to capture images of the real environment 180 that are passed through for display on displays 120*a* and 120*b*. Device 100*a* is overlaying a computer-generated hat 160*d* (a virtual object) on the head of representation 170*a* of person 180*a* for display on each of displays 120*a* and 120*b*. Device 100*a* tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of representation 170a of person 180a.

FIG. 1H illustrates device 100a carrying out a mixed reality technique, and in particular an augmented virtuality technique, using pass-through video. Device 100a is displaying, on displays 120a and 120b, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a. Device 100a places the representation 170a of the person 180a in the virtual environment for display on displays 120a and 120b. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of the representation 170a of person 180a. Notably, in this example, device 100a does not display a representation of tree 180b even though tree 180b is also within the field of view of the image sensor(s) 108 of device 100a, in carrying out the mixed reality technique.

Figure 1I:
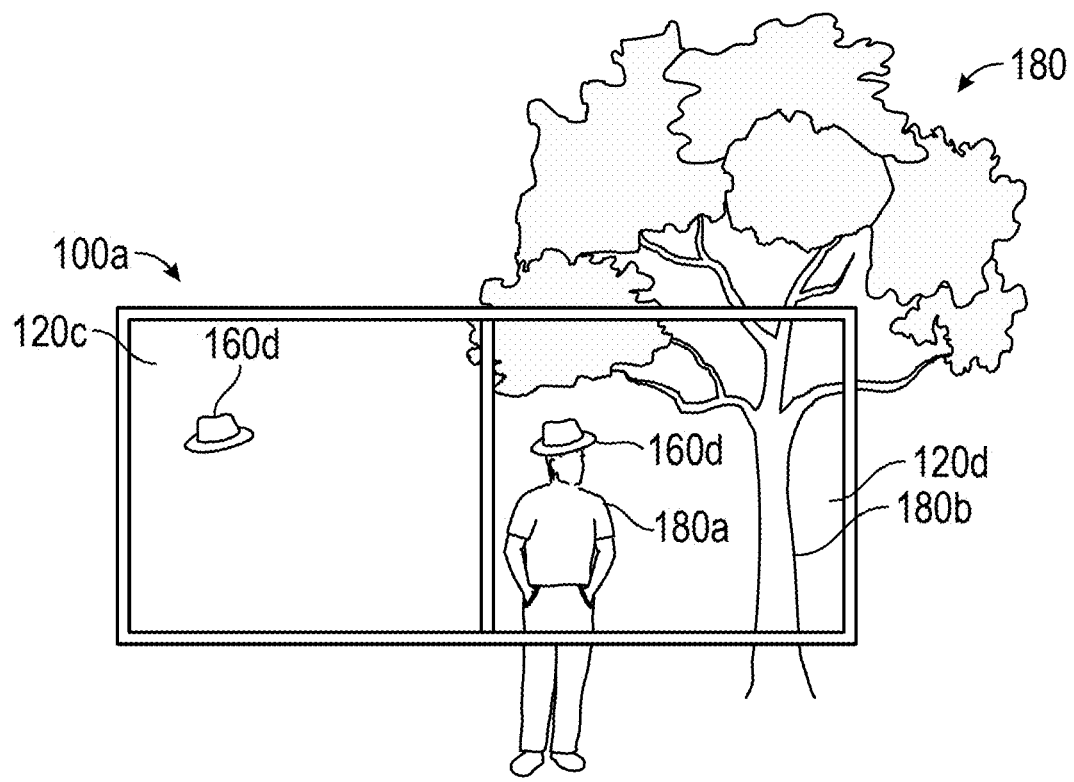
FIG. 1I illustrates an example of the system in the form of a head-up display device.

FIG. 1I illustrates an example of system 100 in the form of device 100a. In FIG. 1I, device 100a is a HUD device (e.g., a glasses device) configured to be worn on the head of a user, with each eye of the user viewing a respective heads-up display 120c and 120d. FIG. 1I illustrates device 100a carrying out an augmented reality technique using heads-up displays 120c and 120d. The heads-up displays 120c and 120d are (at least partially) transparent displays, thus allowing the user to view the real environment 180 in combination with heads-up displays 120c and 120d. Device 100a is displaying, on each of heads-up displays 120c and 120d, a virtual hat 160d (a virtual object). The device 100a tracks the location and/or orientation of physical objects in the real environment with respect to the position and/or orientation of device 100a and with respect to the position of the user's eyes to enable virtual objects to interact with physical objects from real environment 180. In this example, device 100a accounts for movements of device 100a, movements of the user's eyes with respect to device 100a, and movements of person 180a to display hat 160d at locations on displays 120c and 120d such that it appears to the user that the hat 160d is on the head of person 180a.

Figure 2:
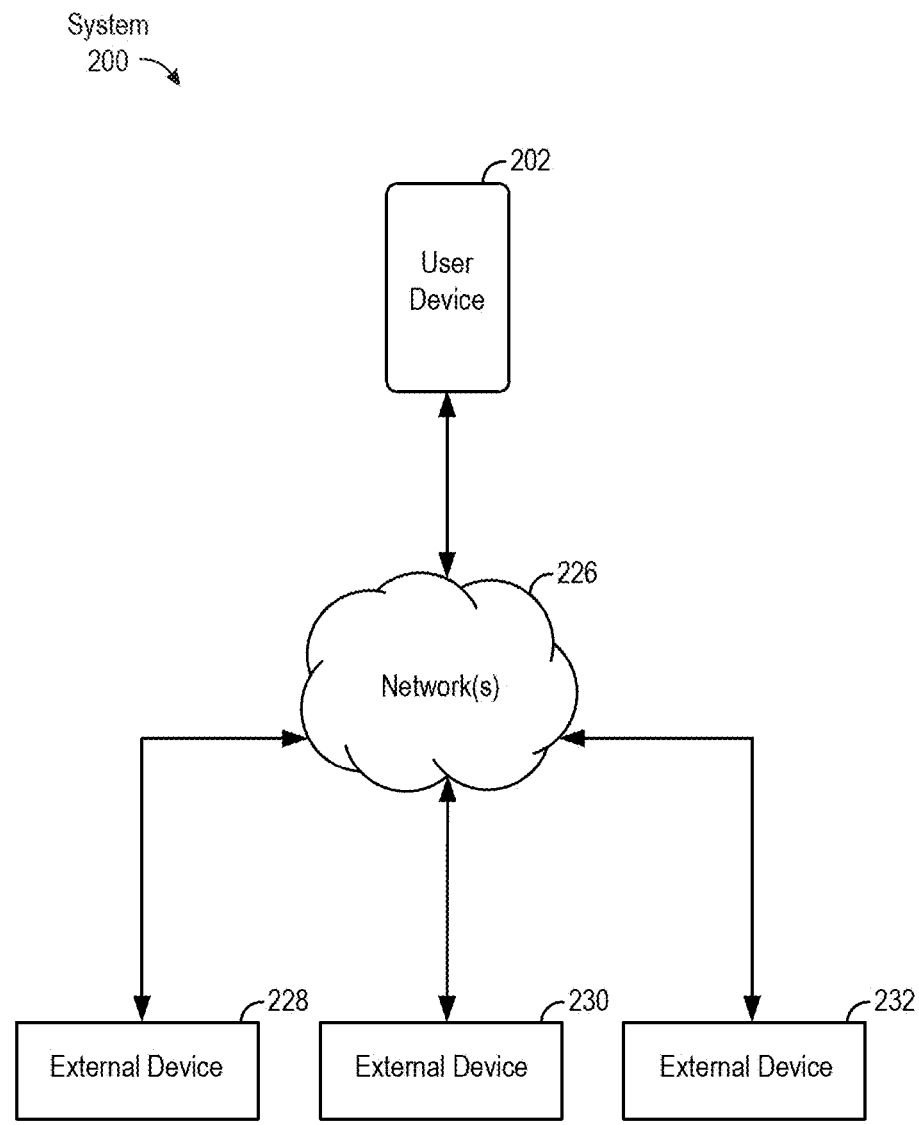
FIG. 2 depicts an exemplary system for implementing various techniques of controlling an external device using a reality interface.

FIG. 2 depicts exemplary system 200 for implementing various techniques of controlling an external device using a reality interface. System 200 includes user device 202 configured to interact with external devices 228, 230, and 232. User device 202 is similar to or the same as one or more of devices 100a, b, or c in system 100 (FIGS. 1A-1B). In some embodiments, user device 202 is configured to interact with external devices 228, 230, and 232 via a wireless communication connection. The wireless communication connection is established, for example, via one or more networks 226. Network(s) 226 can include a Wi-Fi™ network or any other wired or wireless public or private local network. Additionally or alternatively, user device 202 establishes a wireless communication connection directly with electronic devices 228, 230, or 232 using, for example, a short-range communication protocol, Bluetooth™, line of sight, peer-to-peer, or another radio-based or other wireless communication. Thus, in the illustrated embodiment, user device 202 can be located near electronic devices 228, 230, and 232, such that it communicates with them directly or over the same local network. For example, user device 202 and electronic devices 228, 230, and 232 are located within the same physical environment (e.g., room of a home or building), and network(s) 226 include the home or building's Wi-Fi™ network. Electronic devices 228, 230, and 232 can include any type of remotely controlled electronic device, such as a light bulb, garage door, door lock, thermostat, audio player, television, or the like.

Figure 3A:
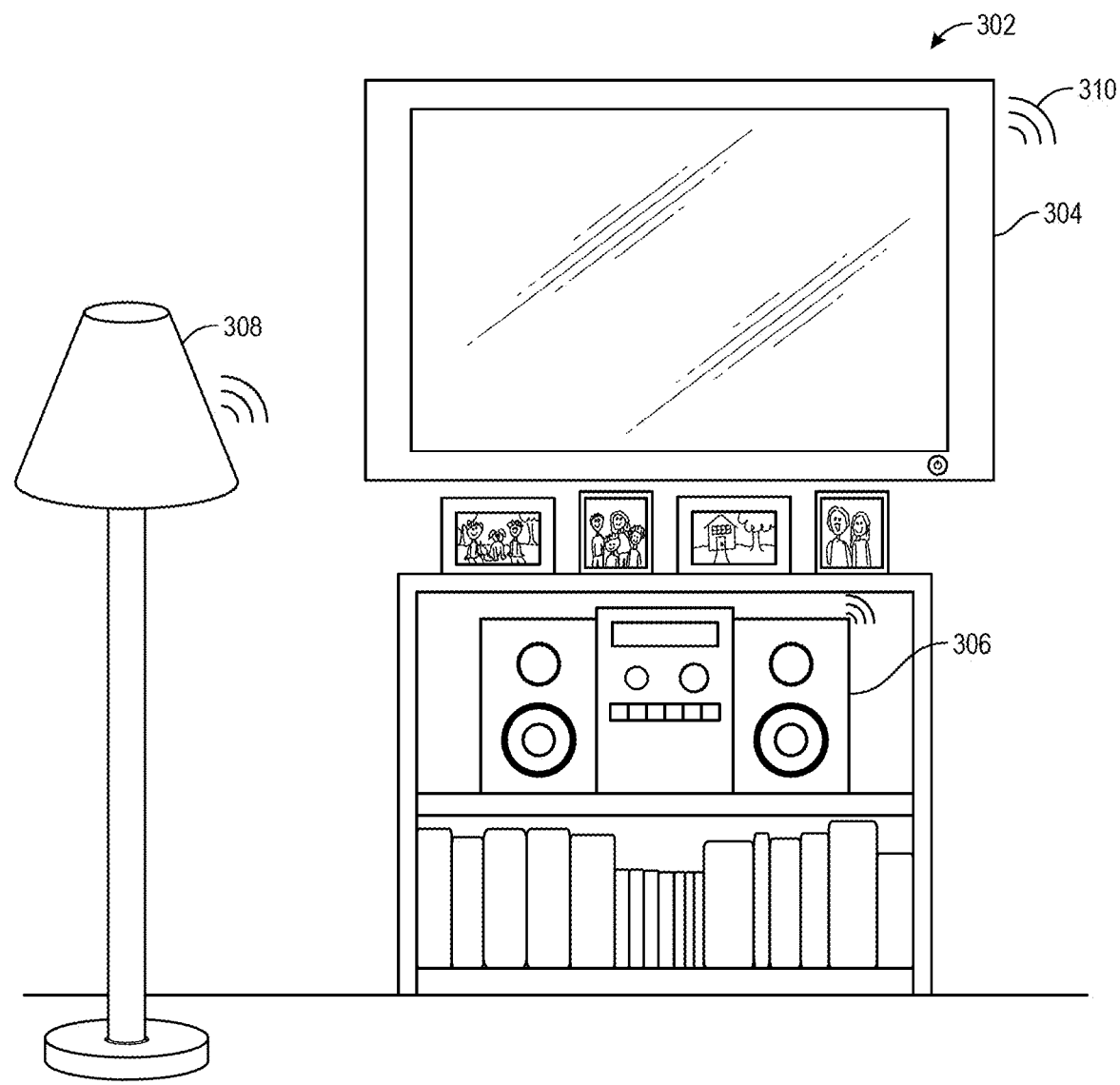
FIG. 3A depicts a physical environment that includes external devices.

With reference now to FIGS. 3A-3F, exemplary techniques for accessing a function of an external device through a reality interface are described. FIG. 3A depicts physical environment 302 that includes external devices 304, 306, and 308. Physical environment 302 is, for example, the physical environment of the user. For instance, in the present embodiment, the user can be sitting in his living room and physical environment 302 is at least a portion of the user's living room that is directly in front of the user. The user may wish to access a function of one of external devices 304, 306, and 308. As described in greater detail below, the user can utilize a reality interface provided by the user's device (e.g., user device 312) to access a function of one of external devices 304, 306, and 308.

Figure 3B:
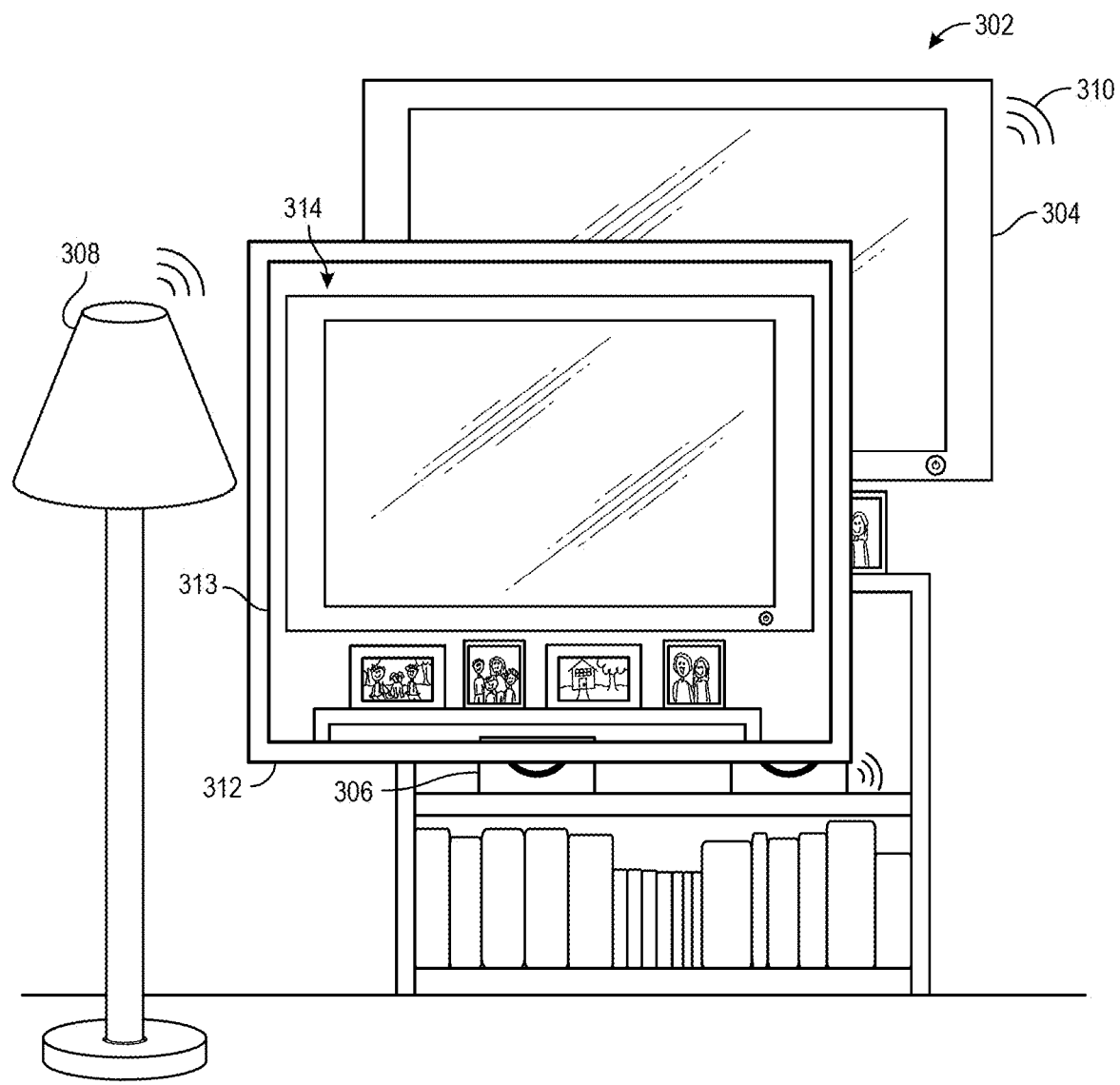
FIG. 3B depicts a user device displaying, in a reality interface, a representation of a physical environment.

FIG. 3B depicts user device 312 displaying representation 314 of physical environment 302. In the present embodiment, user device 312 is a standalone device (e.g., device 100a), such as a hand-held mobile device or a standalone head-mounted device. It should be recognized that, in other embodiments, user device 312 is communicatively coupled to another device, such as a base device. For example, user device 312 can be a head-mounted display device (e.g., device 100c) that is communicatively coupled to another device (e.g., device 100b), such as a base device containing a CPU. In these embodiments, the operations described below for accessing a function of an external device through a reality interface can be divided up in any manner between user device 312 and the other device.

Further, in the present embodiment, display 313 of user device 312 is opaque where the user is unable to see physical environment 302 through display 313. For example, visible light emitted or reflected from physical objects of physical environment 302 is unable to substantially transmit (e.g., less than 5% transmission) through display 313. In other embodiments, display 313 is transparent where the user is able to see physical environment 302 through display 313. For example, visible light emitted or reflected from physical objects of physical environment 302 is able to substantially transmit (e.g., greater than 40% transmission) through display 313. In one embodiment, display 313 is a transparent LCD (liquid-crystal display) or LED (light emitting diode) display. In another embodiment, user device 312 is a pair of see-through near-eye glasses with integrated displays.

User device 312 is configured to provide a reality interface. The reality interface is used, for example, to access a function of one of external devices 304, 306, and 308. External devices 304, 306, and 308 are similar to external devices 228, 230, and 232 of FIG. 2, described above. In particular, external devices 304, 306, and 308 are devices that are capable of being wirelessly controlled by user device 312. For example, external device 304 is a television having functions such as power on/off, volume, channel, closed caption, or the like. External device 306 is an audio system having functions such as power on/off, volume, radio tuning, playlist selection, or the like. External device 308 is a lamp having functions such as on/off and brightness adjustment (e.g., dimming). Each of these exemplary functions of external devices 304, 306, and 308 can be accessed using the reality interface provided by user device 312. While only three external devices 304, 306, and 308 are shown, it should be appreciated that, in other embodiments, the physical environment can include any number of external devices.

User device 312 detects external devices 304, 306, and 308 in physical environment 302. In this embodiment, the detection is based on wireless communication (as depicted by lines 310 in FIG. 3B) between user device 312 and external devices 304, 306, and 308. In some embodiments, the wireless communication is near-field or short-range wireless communication (e.g., Bluetooth™). User device 312 receives, via wireless communication, identification information from external devices 304, 306, and 308 and recognizes, based on the received identification information, that external devices 304, 306, and 308 are proximate to user device 312. In some embodiments, user device 312 transmits a request and/or broadcasts an inquiry (e.g., discovery) to cause external devices 304, 306, and 308 to transmit the identification information. In some embodiments, user device 312 transmits the request and/or broadcasts the inquiry responsive to a determination that external devices are probable (e.g., above a threshold of confidence) in the field of view of image sensors 108 of the user device. In other embodiments, external devices 304, 306, and 308 automatically broadcast the identification information periodically independent of any inquiry from user device 312. User device 312 thus detects external devices 304, 306, and 308 upon receiving respective identification information from external devices 304, 306, and 308.

In some embodiments, the identification information includes an identifier for the respective external device. The identifier is, for example, a sequence of characters that represents the respective external device. In some embodiments, the identification information also includes information specifying the device type and/or the function(s) offered by the respective external device. In a specific embodiment, the identification information received from external device 304 includes the identifier "DISPLAY01," the device type "TELEVISION," and the function "ON/OFF."

User device 312 obtains image data of physical environment 302. For example, one or more image sensors (e.g., image sensor(s) 108) of user device 312 captures image data of physical environment 302. The image data includes, for example, images and/or videos of physical environment 302 captured by the image sensor(s). Specifically, in one embodiment, the image data includes a live video preview of at least a portion of the physical environment captured by the image sensor(s).

User device 312 generates representation 314 of physical environment 302 according to the obtained image data. In some embodiments, the representation includes at least a portion of the live video preview captured by the image sensor(s). In some embodiments, captured images and/or videos of physical environment 302 are assembled to compose representation 314 of physical environment 302. As shown in FIG. 3B, user device 312 displays, on its display 313, representation 314 of physical environment 302 as part of the reality interface provided by user device 312. In the present embodiment, the field of view provided by representation 314 represents only a portion of physical environment 302 observed from a line-of-sight position of the user. In particular, representation 314 includes a representation of external device 304, but not representations of external devices 306 and 308. It should be recognized that in other embodiments, the field of view can vary. Further, in examples where display 313 is transparent, it should be recognized that representation 314 of physical environment 302 is not displayed on user device 312. Instead, a direct view of physical environment 302 is visible to the user as a result of light emitted or reflected from physical environment 302 being transmitted through display 313 into the user's eyes.

User device 312 determines whether displayed representation 314 includes any of the detected external devices 304, 306, and 308. For example, user device 312 determines whether displayed representation 314 includes a representation of external device 304. The determination can serve to identify the specific external device (304, 306, or 308) associated with the functions the user wishes to access via the reality interface. In some embodiments, the determination is performed by determining whether the obtained image data includes a representation of external device 304. In one embodiment, user device 312 determines a similarity measure between portions of the image data and one or more stored images of external device 304. If the similarity measure is greater than a predetermined threshold, the image data is determined to include a representation of external device 304. Conversely, if the similarity measure is less than a predetermined threshold, the image data is determined to not include a representation of external device 304. As described in greater detail below, additional techniques, such as three-dimensional object recognition, location-based correlation, or the like can be utilized to determine whether the obtained image data includes a representation of external device 304.

Figure 3C:
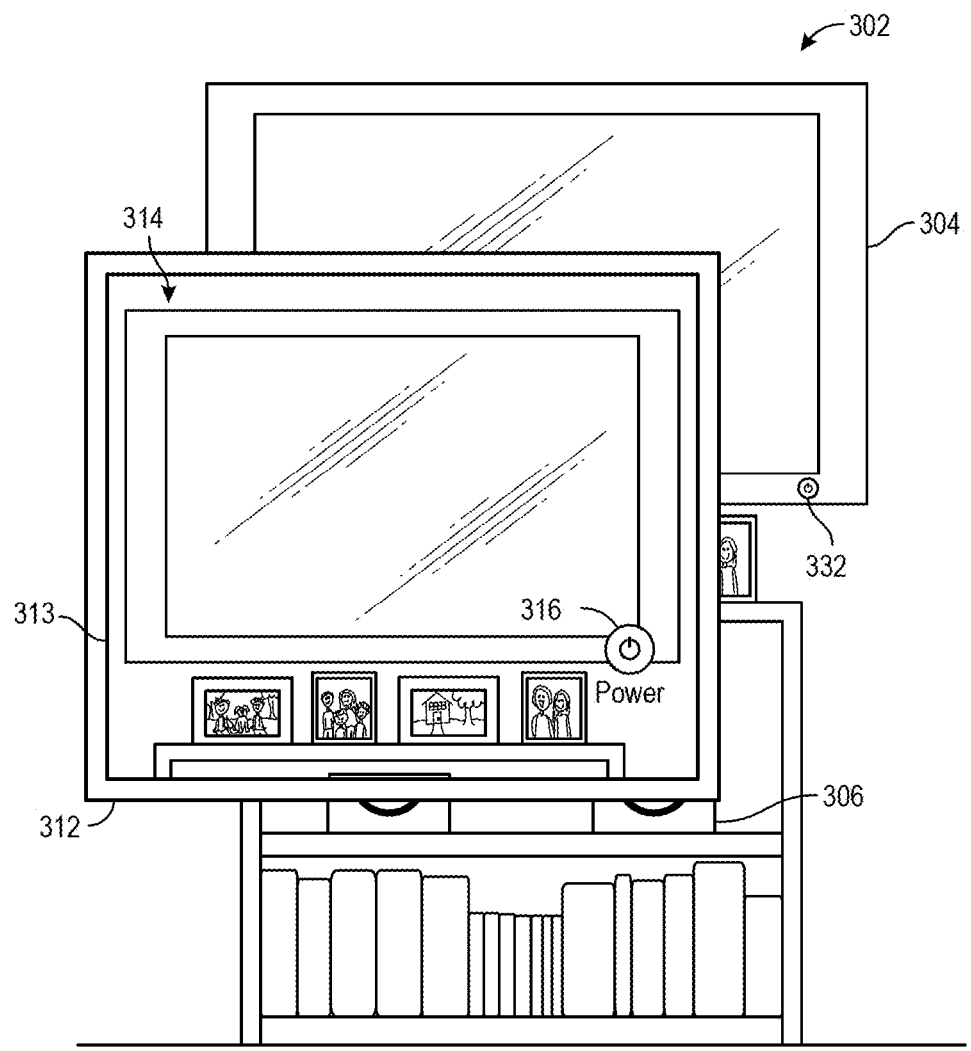
FIG. 3C depicts a user device concurrently displaying, in a reality interface, a representation of a physical environment and an affordance corresponding to a function of an external device in the physical environment.

In some embodiments, with reference to FIG. 3C, prior to user device 312 detecting external device 304, user device 312 and external device 304 each contain respective authentication information that enables the devices to establish a wireless communication connection (e.g., near-field or short range direct wireless communication connection) with each other. For example, external device 304 and user device 312 are paired prior to user device 312 detecting external device 304. In these embodiments, upon detecting external device 304, user device 312 establishes a wireless communication connection with external device 304 (e.g., using the authentication information). The wireless communication connection is, for example, a wireless network connection (e.g., connection via a Wi-Fi™ network). In some embodiments, the wireless communication connection is a direct peer-to-peer wireless communication connection (e.g., Bluetooth™ connections) that enables single-hop point-to-point communications across a secure wireless communication channel between user device 312 and external device 304. After establishing the wireless communication connection, external device 304 provides user device 312 with information regarding the current functions available on external device 304. For example, external device 304 transmits information to external device 304 indicating that the power ON/OFF function is currently available on external device 304.

As shown in FIG. 3C, in accordance with determining that the image data includes a representation of external device 304, user device 312 concurrently displays, on its display 313, representation 314 of physical environment 302 and affordance 316 corresponding to the one or more functions indicated as being available on the external device 304 (e.g., power ON/OFF function of external device 304). In this embodiment, affordance 316 is a virtual object that does not exist in physical environment 302, even though the function of affordance 316 is analogous that of physical power button 332. Affordance 316, when activated by the user, causes user device 312 to turn external device 304 either on (if external device 304 is off) or off (if external device 304 is on). Accordingly, affordance 316 enables the user to access the power ON/OFF function of external device 304 using the reality interface provided by user device 312.

Figure 3D:
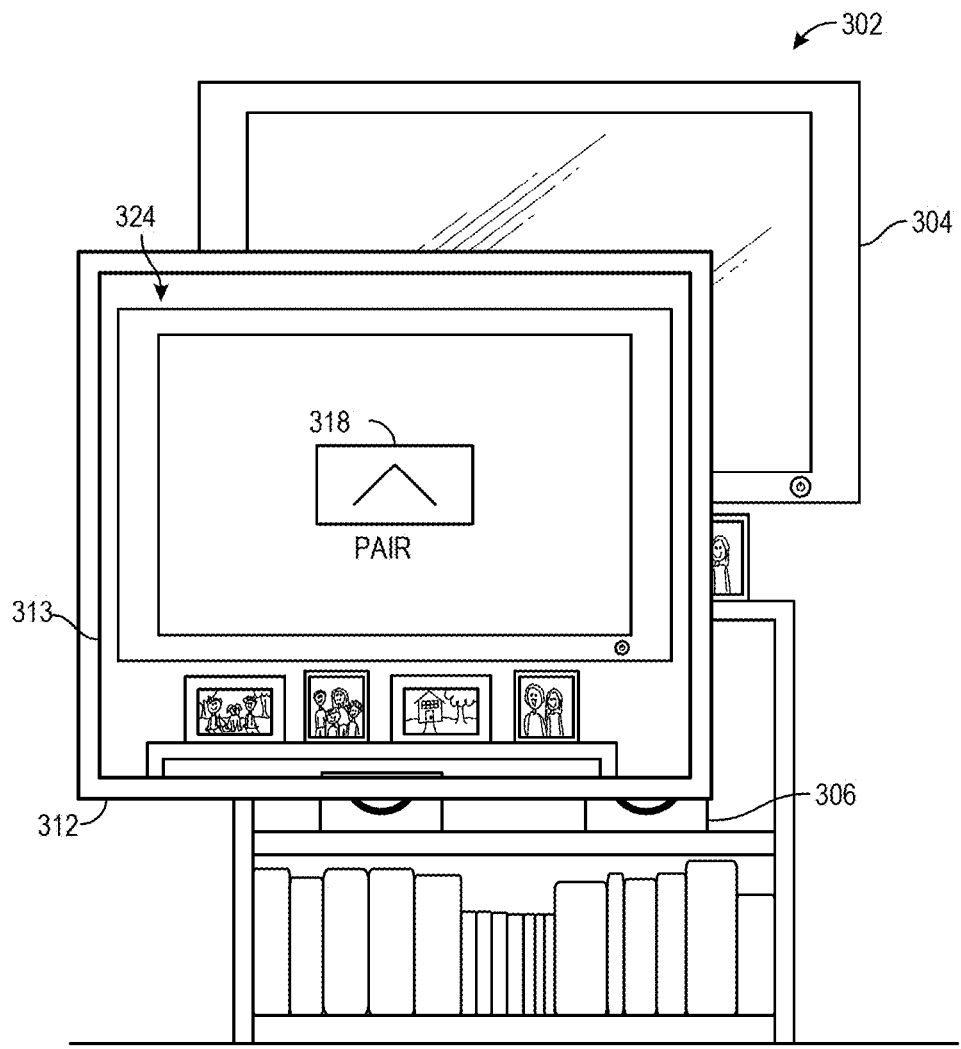
FIG. 3D depicts a user device concurrently displaying, in a reality interface, a representation of a physical environment and an affordance corresponding to a function of an external device in the physical environment.

In other embodiments, with reference to FIG. 3D, user device 312 and external device 304 are not yet authorized to establish a wireless communication connection with each other. Specifically, although user device 312 and external device 304 are capable of establishing a wireless communication connection with each other, the devices do not possess, prior to user device 312 detecting external device 304, the required authentication information to do so. For example, the devices have not been paired with each other prior to user device 312 detecting external device 304. In these embodiments, external device 304 provides user device 312 information indicating its capability to establish a wireless communication connection with user device 312. The information is, for example, included in the identification information received by user device 312 from external device 304. As shown in FIG. 3D, in accordance with determining that the image data includes a representation of external device 304, user device 312 concurrently displays, on its display 313, representation 324 of physical environment 302 and affordance 318 corresponding to the wireless communication connection function of external device 304. In the present embodiment, affordance 318, when activated, is configured to initiate an authentication process (e.g., pairing process) that would enable user device 312 and external device 304 to establish a wireless communication connection with each other. More specifically, if user device 312 detects user activation of affordance 316 via the reality interface, user device 312 would cause authentication information to be distributed between user device 312 and external device 304. In some embodiments, after exchanging the authentication information, the authentication information is used by user device 312 and external device 304 to establish a wireless communication connection between user device 312 and external device 304. Accordingly, affordance 318 enables the user to access a wireless communication connection function of external device 304 using the reality interface provided by user device 312.

In some embodiments, external device 304 displays the required authentication information for establishing the wireless communication connection. The authentication information is, for example, a passcode or an optical pattern (visible or invisible) that encodes a passcode. The displayed information is captured by the image sensor(s) of user device 312 in the form of image data and the image data is processed to extract the authentication information. The extracted authentication information is then used by user device 312 to establish the wireless communication connection with external device 304.

It should be recognized that, in examples where display 313 of user device 312 is transparent, the affordance (e.g., 316 or 318) is displayed on display 313 without needing to display a live image (e.g., representation 314 or 324) of physical environment 302 as the physical environment is directly visible to the user. Thus, from the perspective of the user, the displayed affordance appears to be overlaid on the physical environment visible in the background through the transparent display. In some embodiments, the affordance is displayed at a position on display 313 corresponding to external device 304 and with respect to the gaze direction (e.g., line-of-sight) of the user's eyes. For example, the affordance (e.g., 314 or 324) is positioned on display 313 such that from the perspective of the user, the affordance (e.g., 314 or 324) appears to overlay at least part of the respective physical external device (e.g., 304).

Figure 4:
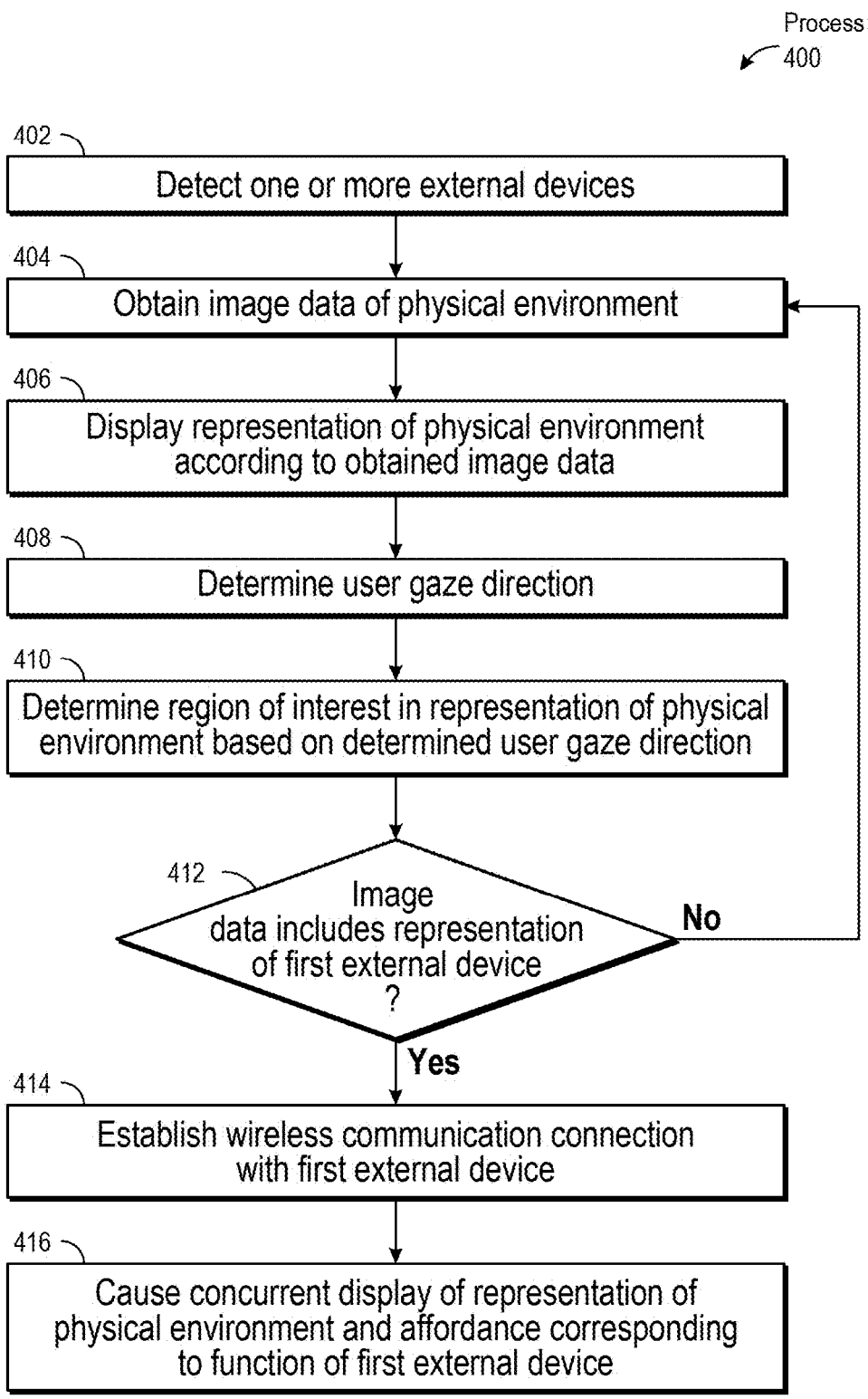
FIG. 4 depicts a flow chart of an exemplary process for accessing a function of an external device through a reality interface.

Turning now to FIG. 4, a flow chart of exemplary process 400 for accessing a function of an external device through a reality interface is depicted. In the description below, process 400 is described as being performed using a user device (e.g., device 100a). The user device is, for example, a handheld mobile device or a head-mounted device. It should be recognized that, in other embodiments, process 400 is performed using two or more electronic devices, such as a user device (e.g., device 100c) that is communicatively coupled to another device (e.g., device 100b), such as a base station device. In these embodiments, the operations of process 400 are distributed in any manner between the user device and the other device. Further, it should be appreciated that the display of the user device can be transparent or opaque. Although the blocks of process 400 are depicted in a particular order in FIG. 4, it should be appreciated that these blocks can be performed in any order. Further, one or more blocks of process 400 can be optional and/or additional blocks can be performed.

At block 402, one or more external devices (e.g., external devices 304, 306, and 308) of a physical environment (e.g., physical environment 302) are detected. In some embodiments, the detection is based on wireless communication (e.g., near-field or short-range wireless communication, such as Bluetooth™ or Wi-Fi Direct™) between the user device and the one or more external devices. Specifically, the user device detects one or more external devices that are within wireless range (e.g., within a predetermined distance) of the user device. In one embodiment, the user device wirelessly transmits (e.g., broadcasts) a request and/or an inquiry signal that is received by the one or more external devices in the physical environment. The inquiry signal, when received by the one or more external devices, causes the one or more external devices to transmit identification information to the user device. The user device thus detects the one or more external devices upon receiving the identification information from the one or more external devices. As described above, In some embodiments, the identification information includes an identifier for each respective external device of the one or more external devices. The identifier is, for example, a sequence of characters that represents the respective external device.

In other embodiments, each of the one or more external devices wirelessly broadcasts identification information into the surrounding region. For example, the one or more external devices automatically broadcasts identification information periodically and independent of any inquiry signal from the user device. In these embodiments, the user device detects the one or more external devices upon receiving the broadcasted identification information.

In some embodiments, the user device receives information from the one or more external devices specifying the device type for each respective external device. In some embodiments, the received information specifies one or more functions of each respective external device that can be accessed or controlled wirelessly. In some embodiments, the information specifying the device type and/or device functions is included in the identification information received from the one or more external devices. In other embodiments, the user device obtains the information specifying the device type and/or device functions from the one or more external devices upon detecting the one or more external devices. Specifically, upon detecting the one or more external devices, the user device sends a request to the one or more external devices which, when received by the one or more external devices, causes the one or more external devices to provide information specifying the device type and/or functions to the user device.

At block 404, image data of at least a portion of the physical environment is obtained. For example, the obtained image data is captured by one or more image sensors (e.g., image sensor(s) 108) of the user device. In some embodiments, the image data substantially corresponds to a portion of the physical environment observed from a line-of-sight position of the user. In some embodiments, the image data includes a sequence of images and/or a video preview of the physical environment captured by the image sensor(s). The physical environment is any physical environment surrounding the user or the user device. For example, the physical environment includes a region of the user's home (e.g., kitchen, living room, bedroom, garage, etc.), a part of the user's workplace environment (e.g., office, conference room, lobby, etc.), a school environment (e.g., classroom), or a public environment (e.g., restaurant, library, etc.).

At block 406, a representation (e.g., representation 314) of the physical environment is displayed (e.g., on the display of the user device) according to the obtained image data of block 404. The representation of the physical environment is part of the reality interface provided by the user device and is created using the obtained image data. In particular, the representation of the physical environment includes representations of the physical objects (e.g., external device 304) in the physical environment. In some embodiments, the representation of the physical environment comprises a live video preview of the physical environment captured by the image sensor(s). In some embodiments, the image characteristics (e.g., contrast, brightness, shading, etc.) of the live video preview are not substantially modified. Alternatively, the image characteristics of the live video preview are modified to improve image clarity or to emphasize relevant features in the reality environment. In some embodiments, the representation of the physical environment is a generated virtual environment corresponding to the physical environment. In examples where process 400 is performed using a user device having a transparent display, block 406 is optional.

At block 408, a user gaze direction is determined. For example, second image data of the user is captured by one or more second image sensors (e.g., image sensor(s) 124) of the user device. In particular, the second image sensor(s) is facing the user in a direction opposite of the image sensor(s) of block 404. The second image data captured by the second image sensor(s) includes, for example, image data (e.g., images and/or video) of the user's eyes. Using the image data of the user's eyes, the user gaze direction for each of the user's eyes is determined. Specifically, the center of the user's cornea, the center of the user's pupil, and the center of rotation of the user's eyeball are determined to determine the position of the visual axis of the user's eye. The visual axes of each of the user's eyes define the user gaze direction. The gaze direction can also be referred to as the gaze vector or line-of-sight.

As described in greater detail below, the present disclosure contemplates embodiments in which the user can selectively block the use of, or access to personal information data, such as the image data of the user's eyes, data containing the determined user gaze direction, and/or the region of interest determined in block 410. For example, process 400 can allow users to select to "opt in" or "opt out" of the collection and/or use of such personal information data. In some embodiments, the user can select to only collect and process such personal information data on the user's device (e.g., device 100a or device 100b) and block any unauthorized transmission of such personal information data to any remote device.

At block 410, a region of interest in the displayed representation of the physical environment is determined based on the second image data of block 408. In some embodiments, the region of interest corresponds to the region in the displayed representation of block 406 where the user is focusing his/her gaze within the field of view. The region of interest is determined, for example, using the user gaze direction determined at block 408. By way of example, the visual axes of each of the user's eyes are extrapolated onto a plane of the displayed representation of the physical environment. In some embodiments, the plane of the displayed representation of the physical environment corresponds to the plane of the display of the user device. The region of interest is, for example, the portion of the representation of the physical environment where the extrapolated visual axes of the user's eyes intersect with the plane of the displayed representation of the physical environment.

Figure 3E:
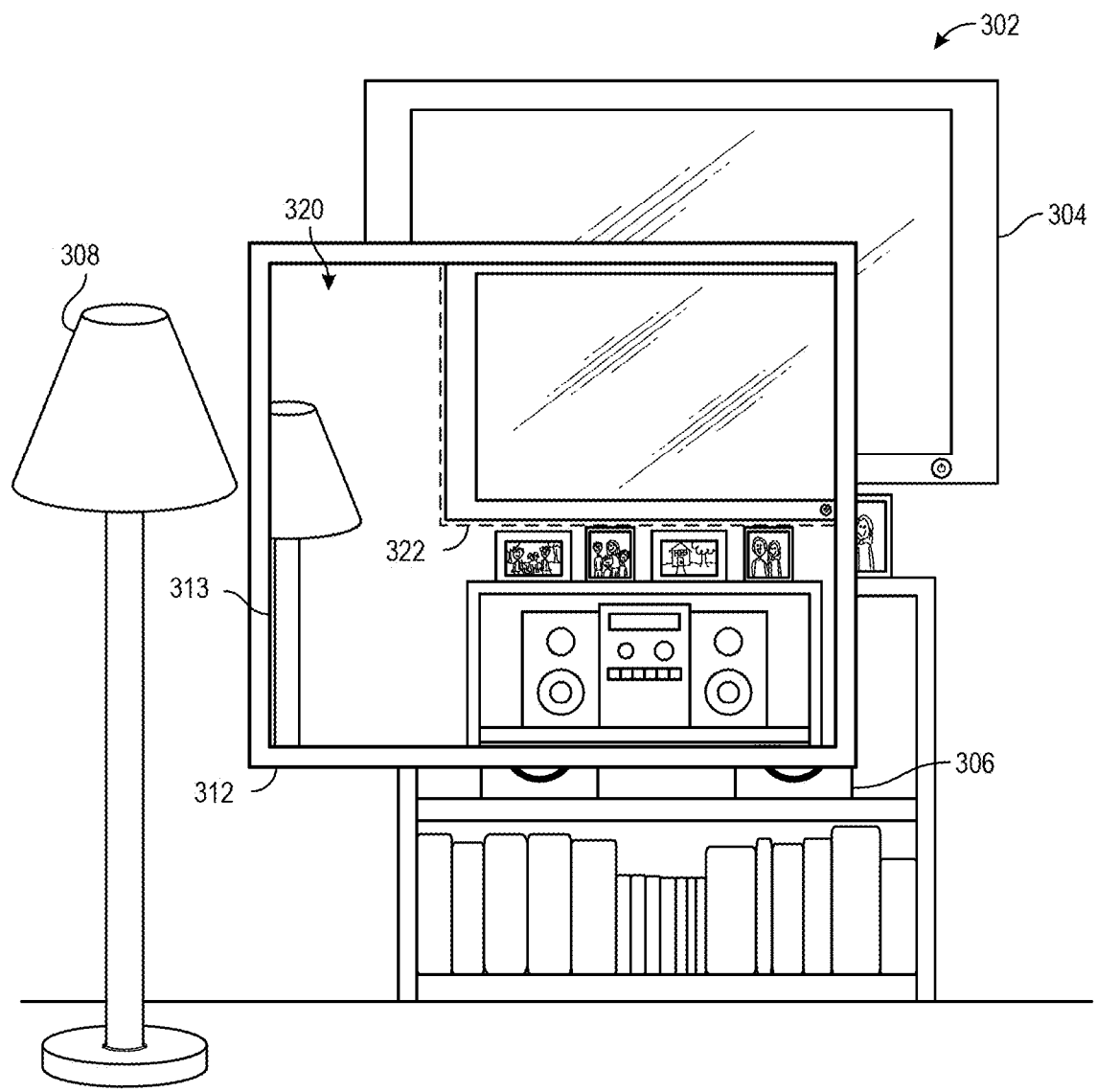
FIG. 3E depicts a user device displaying a representation of a physical environment in a reality interface.

FIG. 3E is illustrative of block 410. As shown, representation 320 of physical environment 302 is displayed on user device 312 (e.g., according to block 406). In this embodiment, representation 320 has a larger field of view compared to representation 314 depicted in FIG. 3B. In particular, representation 320 includes representations of devices 304 and 306. In this embodiment, process 400 determines that the extrapolated visual axes of the user's eyes intersect with a plane of representation 320 at the region defined by dotted line 322. Thus, in this embodiment, the portion of representation 320 defined by dotted line 322 is the region of interest. In some embodiments, the determined region of interest is used to disambiguate between two or more possible electronic devices in the field of view of representation 320. Specifically, in these embodiments, based on the determined region of interest, it can be determined that the user intends to access the function of device 304, and not device 306. As will become apparent in the description below, determining the region of interest can reduce the amount of computation required to correlate a represented object in the displayed representation of block 406 with a corresponding detected external device that the user wishes to access.

It should be recognized that, in examples where process 400 is performed using a user device having a transparent display, the region of interest corresponds to the region in the physical environment where the user is focusing his/her gaze. For example, the region of interest is defined by the region where the extrapolated visual axes of the user's eyes intersect with one or more surfaces of the physical environment.

In some embodiments, blocks 408 and 410 are performed prior to block 412. Further, In some embodiments, blocks 408 and 410 are performed while displaying the representation of the physical environment at block 406.

At block 412, a determination is made as to whether the image data of block 404 includes a representation of a first external device of the one or more detected external devices. For example, as described above with reference to FIG. 3B, a determination is made as to whether the displayed representation 314 of physical environment 302 includes a representation of external device 304. The determination of block 412 serves to map one or more of the detected external devices of block 402 to one or more represented objects in the displayed representation of block 406. In this way, the specific external device(s) associated with functions the user wishes to access can be identified and thus suitable communication can be established with the external device(s) to obtain access to its functions. In some embodiments, block 412 is performed automatically in response to obtaining the image data of block 404. In some embodiments, block 412 is performed while continuing to obtain image data (block 404) and/or while displaying the representation of the physical environment (block 406).

The determination is performed by analyzing the obtained image data of physical environment 302. Various techniques can be implemented using the obtained image data to determine whether the image data includes a representation of the first external device. In some embodiments, image recognition (two-dimensional or three-dimensional) is implemented to determine whether the image data includes a representation of the first external device. In these embodiments, portions of the image data are compared with a plurality of stored images. The plurality of stored images are stored, for example, in a database. Each stored image of the plurality of stored images corresponds to a respective external device. For example, an index of the database associates each stored image with a respective external device. Specifically, the index maps each stored image to a respective identifier, device type, and/or device function of a respective external device. In some embodiments, one or more stored images of the plurality of stored images are known images of the first external device. Process 400 determines a respective similarity measure for each stored image of the plurality of stored images. The similarity measure for a respective stored image represents the degree to which portions of the image data match the respective stored image.

In some embodiments, if it is determined that the similarity measures for one or more stored images corresponding to the first external device is greater than a predetermined threshold, the image data is determined to include a representation of the first external device. Conversely, if it is determined that the similarity measure is not greater than a predetermined threshold, the image data is determined to not include a representation of the first external device. In some embodiments, each of the plurality of stored images is ranked according to the determined similarity measures. If it is determined that the N highest ranked stored images (where N is a predetermined positive integer) correspond to the first external device, the image data is determined to include a representation of the first external device. Conversely, if it is determined that the N highest ranked stored images (where N is a predetermined positive integer) do not correspond to the first external device, the image data is determined to not include a representation of the first external device.

In some embodiments, the determination of block 412 is made using three-dimensional object recognition techniques. In particular, while obtaining the image data (block 404), depth information of the physical environment is obtained. The depth information is used to generate a three-dimensional representation of the physical environment. In some embodiments, generating the three-dimensional representation of the physical environment includes generating a depth map of the physical environment. Each pixel of the depth map is associated with respective distance information between the camera and a surface of the physical environment represented by the respective pixel.

In some embodiments, the depth information is obtained using time-of-flight analysis. Specifically, an infrared light source emits infrared light onto the physical environment and an infrared sensor detects the backscattered light from the surfaces of one or more objects in the physical environment. In some embodiments, the emitted infrared light is an infrared light pulse and the time between emitting the infrared light pulse and detecting the corresponding backscattered light pulse is measured to determine the physical distance from the infrared sensor to the surfaces of one or more objects in the physical environment.

In some embodiments, the depth information is obtained by projecting a light pattern onto the physical environment using a light source (e.g., visible or invisible light source). The light pattern is, for example, a grid of dots or lines with known spacing. The projected light pattern is then captured using a camera (e.g., light sensor, such as an image sensor or infrared sensor). The deformation of the projected light pattern on the surfaces of one or more objects in the physical environment is used to determine the physical distance between the infrared sensor and the surfaces of one or more objects in the physical environment.

In some embodiments, the depth information is obtained using image data of the physical environment captured using two or more image sensors (e.g., at block 404). In these embodiments, the user device includes two cameras that are spaced apart by a known distance. The image sensors of each camera capture image information of the physical environment. In these embodiments, the depth information of the physical environment is determined by the stereo effect of the two cameras. Specifically, the distance offsets (e.g., parallax difference) between common objects in the captured image information of the two cameras are used to determine the depth information of the physical environment.

In some embodiments, the depth information is obtained using image data of the physical environment captured using one image sensor. For example, visual inertial odometry (VIO) techniques are applied to the image data to determine the depth information.

Using three-dimensional object recognition, portions of the generated three-dimensional representation of the physical environment are compared with a plurality of stored three-dimensional device representations. The plurality of stored three-dimensional device representations is stored, for example, in a database. Each stored three-dimensional device representation corresponds to a respective external device. In some embodiments, one or more stored three-dimensional device representations of the plurality of stored three-dimensional device representations are three-dimensional representations of the first external device. Process 400 determines a respective similarity measure for each three-dimensional device representation. The similarity measure for a respective three-dimensional device representation is the degree to which portions of the three-dimensional representation of the physical environment match the respective stored three-dimensional device representation. Using the determined similarity measures for the plurality of stored three-dimensional device representations, it can be determined whether the image data include a representation of the first external device. For example, the determination is made based on comparing the similarity measures to a predetermined threshold or ranking the three-dimensional device representations according to the similarity measures, as described above with respect to image recognition.

In some embodiments, a machine-learned classifier (e.g., a trained neural network model) is used to determine whether the image data includes a representation of the first external device. In these embodiments, the image data is processed to determine a vector representation of the image data. The machine-learned classifier is configured to receive the vector representation and determine, based on the received vector representation, a set of probabilities. Each probability of the set of probabilities is the probability that the image data includes a representation of a respective external device. For example, the set of probability values includes the probability that the image data includes a representation of the first external device, and optionally, one or more additional probabilities indicating the likelihood that the image data includes a representation of other respective devices. In some embodiments, if the probability that the image data includes a representation of the first external device is greater than a predetermined threshold value, then it is determined that the image data includes a representation of the first external device. Conversely, if the probability that the image data includes a representation of the first external device is not greater than a predetermined threshold value, then it is determined that the image data does not include a representation of the first external device. Additionally or alternatively, if the probability that the image data includes a representation of the first external device is the highest probability among the set of probabilities, then it is determined that the image data includes a representation of the first external device. Conversely, if the probability that the image data includes a representation of the first external device is not the highest probability among the set of probabilities, then it is determined that the image data does not include a representation of the first external device.

In some embodiments, the identification information received from the one or more detected external devices at block 402 is used to determine whether the image data includes a representation of the first external device. For example, the identification information is used to narrow down the number of external devices to consider at block 412. In particular, if image recognition is used to determine whether the image data includes a representation of the first external device, then only the stored images corresponding to the identification information (e.g., corresponding to the same device identifier, device type, and/or device function) of the one or more detected external device are compared with the image data. This can reduce the amount of computation required to determine whether the image data includes a representation of the first external device.

Similarly, in some embodiments, the region of interest determined at block 410 is used to determine whether the image data includes a representation of the first external device. Like the identification information received from the one or more detected external devices, the determined region of interest can reduce the amount of computation required at block 412. Specifically, in these embodiments, only the portion of image data corresponding to the determined region of interest is analyzed to determine whether the image data includes a representation of the first external device. For example, if image recognition is used to determine whether the image data includes a representation of the first external device, then only the portion of the image data corresponding to the determined region of interest is compared with the plurality of stored images. Similarly, if three-dimensional object recognition is used to determine whether the image data includes a representation of the first external device, then only the portion of the generated three-dimensional representation of the physical environment corresponding to the region of interest is compared with the plurality of stored three-dimensional device representations.

In some embodiments, the determination of block 412 is made based on optical identifiers displayed on the one or more detected external devices. In particular, while image data of at least a portion of the physical environment is being captured (block 404), one or more of the detected external devices of block 402 display optical identifiers. The determination of whether the image data includes a representation of the first external device is based on a portion of the image data corresponding to the optical identifier.

Figure 3F:
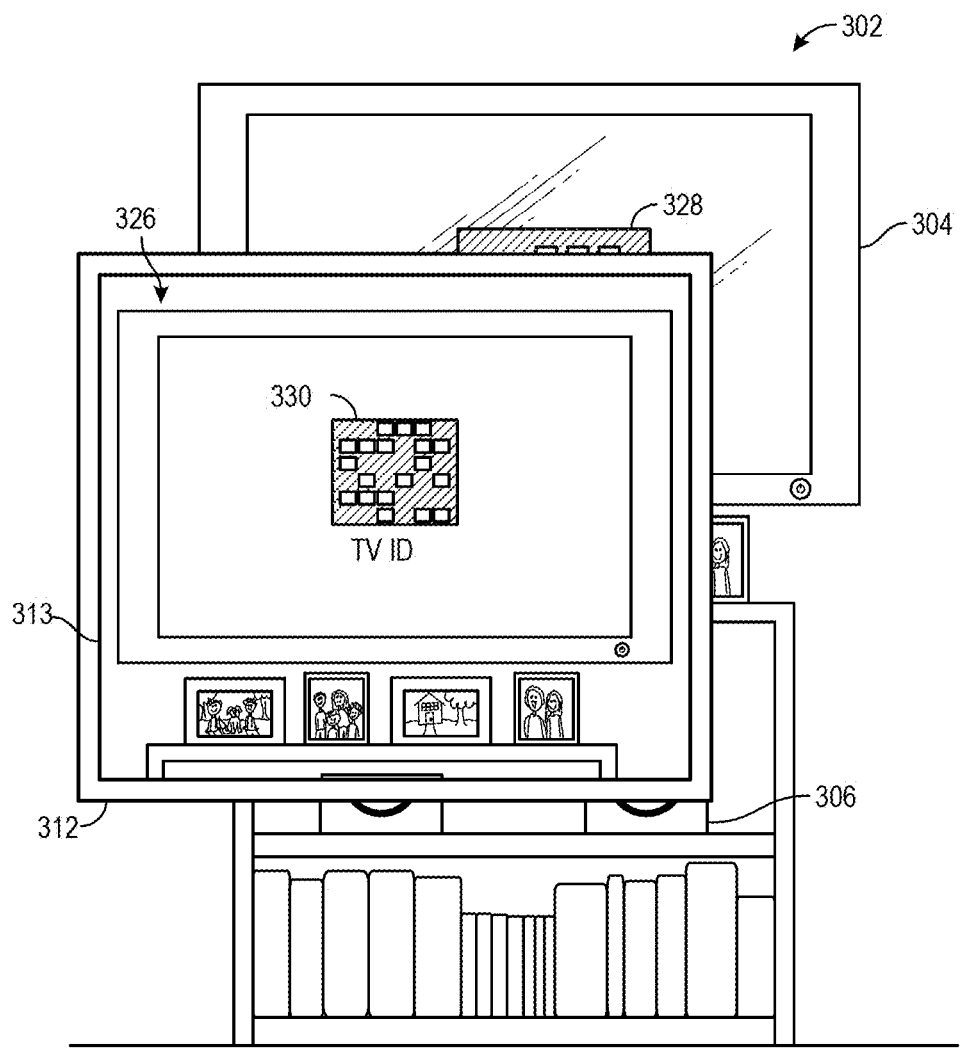
FIG. 3F depicts an external device of a physical environment displaying a unique identifier to facilitate with determining a representation of the external device in the reality interface.

For example, as illustrated in FIG. 3F, external device 304 displays optical identifier 328. Optical identifier 328 is, for example, unique to external device 304. Specifically, the optical identifier displayed by any other external device in physical environment 302 is different from optical identifier 328. In some embodiments, at least a portion of optical identifier 328 is displayed in an invisible light spectrum (e.g., ultraviolet or infrared light). In some embodiments, external device 304 displays optical identifier 328 in response to receiving a request from user device 312. Specifically, in one embodiment, user device 312 transmits a request and/or an inquiry signal (block 402), which when received by external device 304, causes external device 304 to display optical identifier 328 as well as transmit identification information. In another embodiment, in response to detecting the external device 304 (block 402), user device 312 sends a separate request to external device 304, which when received by external device 304, causes external device 304 to display optical identifier 328. In yet other examples, external device 304 displays optical identifier 328 independent of user device 312. For example, external device 304 automatically displays optical identifier 328 as a screensaver while in standby mode or while waiting for a connection to be established with the user device.

In some embodiments, a portion of the image data of block 404 captured by the image sensor of user device 312 corresponds to displayed optical identifier 328. User device 312 displays representation 326 of physical environment 302 (block 406) according to the image data of block 404. As shown in FIG. 3F, representation 326 includes representation 330 of optical identifier 328 displayed on external device 304. In some embodiments, representation 330 of optical identifier 328 or the portion of the image data corresponding to optical identifier 328 is used to determine whether the image data includes a representation of external device 304.

In some embodiments, representation 330 of optical identifier 328 (i.e., the portion of the image data corresponding to optical identifier 328) is compared with one or more stored images of the optical identifier that correspond to external device 304. The comparison is used to determine whether the image data includes a representation of external device 304. For example, a database contains a plurality of stores images of optical identifiers. Each stored image of a respective optical identifier corresponds to a respective external device. The plurality of stored images include one or more stored images of optical identifier 328 corresponding to external device 304. A respective similarity measure is determined for each of the plurality of stored images of optical identifiers. The similarity measure for a respective stored image of an optical identifier represents the degree of match between representation 330 of optical identifier 328 and the respective stored image (or between the portion of the image data corresponding to optical identifier 328 and the respective stored image). Using the determined similarity measures for the plurality of stored images of optical identifiers, it can be determined whether the image data include a representation of external device 304. For example, if it is determined that the similarity measures for one or more stored images of optical identifier 328 corresponding to external device 304 exceed a predetermined threshold, then the image data is determined to include a representation of external device 304. Additionally or alternatively, if it is determined that the similarity measures for one or more stored images of optical identifier 328 are the highest among the similarity measures for the plurality of stored images of optical identifiers, then the image data is determined to include a representation of external device 304.

In some embodiments, optical identifier 328 encodes information that is used to identify external device 304. The information is encoded, for example, in a portion of optical identifier 328 that is displayed in the invisible light spectrum. In some embodiments, optical identifier 328 includes a bar code (e.g., one-dimensional or two-dimensional bar code) representing information that identifies external device 304. In some embodiments, a determination is initially made as to whether optical identifier 328 encodes information. If it is determined that optical identifier 328 includes encoded information, the portion of the image data corresponding to optical identifier 328 is processed to extract (e.g., decode) the encoded information. The determination of whether the image data includes a representation of external device 304 is based on the extracted encoded information. For example, the extracted encoded information includes information identifying external device 304 (e.g., a string of characters identifying external device 304). The extracted encoded information is compared to the identification information received from external devices 304, 306, and 308 at block 402. If it is determined that the extracted encoded information corresponds to (e.g., matches) the identification information received from external device 304 at block 402, then the image data is determined to include a representation of external device 304.

In some embodiments, the determination of whether the image data includes a representation of the first external device is performed using location information. In these embodiments, a location corresponding to the physical environment is determined using the image data of block 406. For example, the image data of block 406 is compared to a plurality of stored images corresponding to various known locations of various physical environments. For example, the plurality of stored images includes stored images of various locations of the user's home (e.g., living room, kitchen, master bedroom, garage, etc.). Additionally or alternatively, the plurality of stored images includes stored images of various locations of the user's workplace (e.g., specific conference rooms, common areas, individual offices, etc.). If the image data of block 406 matches (e.g., similarity measure is greater than a predetermined threshold) one or more stored images corresponding to the user's living room, then it would be determined that the user (or the user's device) is located in the living room of the user's home. Further, using a look-up table or a database, the external devices corresponding to the determined location are determined. For example, if it is determined that the location of the user only has one external device, then it would be likely that any external device captured in the image data of block 404 would be the external device of the determined location. Thus, by determining location information using the image data, the number of external devices to consider at block 412 can be reduced, which reduces the amount of computation required at block 412.

In some embodiments, in accordance with determining that the image data includes a representation of the first external device, blocks 414 and/or 416 are performed. Alternatively, in accordance with determining that the image data does not include a representation of the first external device, one or more of blocks 404 through 412 are repeated.

Although the embodiments described in block 412 utilize the obtained image data to determine the specific external device that the user wishes to access, it should be appreciated that, in some embodiments, other types of data are additionally or alternatively used to determine the specific external device that the user wishes to access. For instance, in some embodiments, data from sensors other than image sensors is utilized to determine the specific external device that the user wishes to access. In some embodiments, wireless signals received from the one or more detected external devices are analyzed to determine the specific external device that the user wishes to access. In some embodiments, the wireless signals are not transmitted over an established direct wireless communication connection between the user device and the one or more detected external devices. In some embodiments, based on the wireless signals (e.g., Wi-Fi™ or Bluetooth™) received from the one or more detected external devices, a determination is made that the first external device (but not the other detected external devices, for example) is within a predetermined range of distances from the user device. Based on this determination, the first external device is determined to be the external device that the user wishes to access. In some embodiments, based on the wireless signals received from the one or more detected external devices, a determination is made that the user device is able to establish a direct wireless communication connection with the first external device. For example, the user device and/or first external device have the require authentication information to establish a direct wireless communication connection with each other (but not with the other detected external devices, for example). Based on this determination, the first external device is determined to be the external device that the user wishes to access. In some embodiments, in accordance with determining that the first external device is the external device that the user wishes to access, one or more of blocks 414 and 416 are performed.

At block 414, a wireless communication connection is established with the first external device. For example, a wireless communication connection is established between the user device and the first external device. In some embodiments, the wireless communication connection is a near-field or short range wireless communication connection (e.g., Bluetooth™, Wi-Fi Direct™, etc.). In some embodiments, the wireless communication connection is a direct wireless connection between the user device and the first external device. Specifically, the wireless communication connection is a direct single-hop, point-to-point wireless communication channel between the user device and the first external device. In some embodiments, block 414 is performed in accordance with determining that the image data includes a representation of the first external device at block 414. In particular, in accordance with determining that the image data includes a representation of the first external device, the user device initiates a connection process that establishes a wireless communication connection between the user device and the first external device. In other embodiments, block 414 is performed in accordance with detecting the first external device at block 402. In these embodiments, upon detecting the first external device, the user device initiates the connection process that establishes a wireless communication connection between the user device and the first external device.

The process for establishing the wireless communication connection includes, for example, exchanging connection information between the user device and the first external device. In some embodiments, the user device and/or first external device are pre-authorized to establish a wireless communication connection (e.g., the devices are previous paired). In these embodiments, the wireless communication connection is established without exchanging authentication information. In other embodiments, the user device and/or first external device require authorization to establish the wireless communication connection. In these embodiments, the process for establishing the wireless communication connection includes exchanging authentication information (e.g., via pairing). In one embodiment, the user device causes the first external device to display the authentication information (e.g., displaying a passcode or optical pattern encoded with a passcode). In some embodiments, the authentication information is displayed in the invisible light spectrum. The displayed authentication information is captured in the form of image data by an image sensor of the user device. The captured image data is then processed to extract the authentication information and the extracted authentication information is used to obtain authorization to establish the wireless communication connection.

At block 416, a representation (e.g., representation 314) of the physical environment (e.g., physical environment 302) according to the image data and an affordance (e.g., affordance 316) corresponding to a function of the first external device are concurrently displayed on a display (e.g., display 120). As used herein, the term "affordance" refers to a user-interactive graphical user interface object. For example, an image or a virtual button each optionally constitute an affordance. In some embodiments, the affordance is displayed at a position in the representation of the physical environment corresponding to the first external device. For example, as shown in FIG. 3C, affordance 316 is displayed at a position overlapping a portion of the representation of the first external device. In some embodiments, the affordance is displayed at a position corresponding to a portion of the first external device associated with the function being accessed. For example, as shown in FIG. 3C, affordance 316 is displayed at a position corresponding to the physical power ON/OFF button 332 of external device 304 The affordance is configured such that detecting a user activation of the displayed affordance causes the first external device to perform an action corresponding to the function. For example, in response to detecting user activation of the displayed affordance, the user device sends instructions to the first external device (e.g., via the established wireless communication connection), which when received by the first external device, causes the first external device to perform an action corresponding to the function.

In some embodiments, prior to displaying the affordance, block 416 includes determining the affordance from a plurality of candidate affordances based on information received from the first external device. In some embodiments, the information is received upon detecting the first external device (block 402). In other embodiments, the information is received upon establishing a wireless communication connection with the first external device (block 414). The information includes, for example, one or more available functions of the first external device. Based on the available functions, the affordance is selected from a plurality of candidate affordances and displayed concurrently with the representation of the physical environment.

In some embodiments, the information received from the first external device specifies an operating status of the first external device (e.g., power on/off status, current channel, current volume level, current media file being played, etc.). In these embodiments, a representation of the operating status of the first external device is additionally or alternatively displayed concurrently with the representation of the physical environment. In some embodiments, the representation of the operating status is an affordance, which when activated by the user, causes more detailed information regarding the operating status of the first electronic device to be concurrently displayed with the representation of the physical environment. For example, the displayed representation of the operating status is an affordance indicating that the first external device is playing an audio file. Upon detecting user activation of the displayed representation of the operating status, additional information regarding the playing audio file (e.g., title, artist, etc.) is displayed.

In some embodiments, the representation of the operating status is integrated with the displayed affordance that is configured to access a function of the first electronic device. For instance, in one embodiment, with reference to FIG. 3C, the information received from external device 304 specifies that external device 304 is currently in a "power off" state. Based on this operating status, affordance 316 includes a representation of this operating status (e.g., red color or flashing indication). User activation of affordance 316 causes external device 304 to power on.

It should be recognized that, in examples where process 400 is performed using a user device having a transparent display, the affordance corresponding to a function of the first external device is displayed on the transparent display without displaying the representation of the physical environment. Thus, from the perspective of the user, the displayed affordance appears to be overlaid on the physical environment visible in the background through the transparent display. In some embodiments, the affordance is displayed at a position on the transparent display corresponding to the first external device and with respect to the gaze direction (e.g., line-of-sight) of the user's eyes. For example, the affordance is positioned on the transparent display such that from the perspective of the user, the affordance appears to overlay at least part of the first external device visible in the background through the transparent display.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

One aspect of the present technology includes the gathering and use of data available from various sources to improve the accessing of a function of an external device using a reality interface. The present disclosure contemplates that in some instances, this gathered data may include personal information data that uniquely identifies or can be used to locate a specific person. Such personal information data can include image data of the user's eye(s), user gaze direction data, region of interest data, demographic data, location-based data, telephone numbers, email addresses, twitter IDs, home addresses, or any other identifying or personal information.

The present disclosure recognizes that the use of such personal information data, in the present technology, can be used to the benefit of users. For example, the personal information data can be used to more effectively access the function of an external device using a reality interface. For example, utilizing a determined region of interest of a user based on the user gaze direction can reduce the amount of computation required for accessing the function of an external device using a reality interface. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during the set-up of the reality system or anytime thereafter. In another example, users can select to collect and utilize certain personal information, such as the image data of the user's eye(s), the user gaze direction, and/or the user's region of interest, only on the user device and to not provide such personal information data to any remote device (e.g., remote server providing a third-party service). In yet another example, users can select to limit the length of time such personal information data is stored or maintained or entirely prohibit the determination of the user gaze direction or user's region of interest. In addition to providing "opt in" and "opt out" options, the present disclosure contemplates providing notifications relating to the access or use of personal information. For instance, a user may be notified during set-up of the reality system that personal information data will be collected and then reminded again just before personal information data is accessed during operation.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a function of an external device can be accessed using a reality interface based on non-personal information data or a bare minimum amount of personal information, such as very limited image data of the user's eye(s), other non-personal information available to the user device, or publicly available information.

What is claimed is:

1. An electronic device, comprising:
one or more processors; and
memory storing one or more programs configured to be executed by the one or more processors, the one or more programs including instructions for:
obtaining, from an external device, information specifying one or more available functions of the external device;
obtaining image data of a physical environment captured by an image sensor, wherein the physical environment includes the external device;
determining that the image data includes a representation of the external device, wherein determining that the image data includes a representation of the external device comprises:
determining, based on the image data, a probability that the image data includes a representation of the external device; and
determining that the probability exceeds a predetermined threshold value; and
in response to determining that the image data includes a representation of the external device, causing a display to concurrently present:
a view of the physical environment; and
a user-activatable virtual object corresponding to a first function of the one or more available functions of the external device, wherein:
the user-activatable virtual object is selected from a plurality of candidate user-activatable virtual objects based on the information specifying the one or more available functions of the external device,
the user-activatable virtual object is displayed overlaying the view of the physical environment, and
detecting user activation of the displayed user-activatable virtual object causes the external device to perform an action corresponding to the first function.

2. The electronic device of claim 1, wherein the user-activatable virtual object is displayed overlaying the view of the physical environment at a position corresponding to the external device.

3. The electronic device of claim 1, wherein the one or more programs further include instructions for:
prior to obtaining the information specifying the one or more available functions of the external device, providing an inquiry signal to cause the external device to transmit the information specifying the one or more available functions of the external device.

4. The electronic device of claim 1, wherein the one or more programs further include instructions for:
prior to obtaining the information specifying the one or more available functions of the external device, establishing a wireless communication connection with the external device.

5. The electronic device of claim 1, wherein determining that the image data includes a representation of the external device further comprises:
comparing portions of the image data with a plurality of stored images, wherein one or more stored images of the plurality of stored images correspond to the external device.

6. The electronic device of claim 1, wherein determining that the image data includes a representation of the external device further comprises:
while obtaining the image data, obtaining depth information of the physical environment using a depth sensor of the electronic device;
generating a three-dimensional representation of the physical environment using the depth information; and
comparing portions of the three-dimensional representation of the physical environment with a plurality of stored three-dimensional device representations, wherein one or more stored three-dimensional device representations of the plurality of stored three-dimensional device representations correspond to the external device.

7. The electronic device of claim 1, wherein an optical identifier is displayed on the external device while the image data is being captured by the image sensor, and wherein the determination that the image data includes a representation of the external device is based on a portion of the image data corresponding to the optical identifier.

8. The electronic device of claim 7, wherein the one or more programs further include instructions for:
causing the external device to display the optical identifier.

9. The electronic device of claim 1, wherein the one or more programs further include instructions for:
receiving, from the external device, information specifying an operating status of the external device; and
in response to determining that the image data includes a representation of the external device, causing the display to display a representation of the operating status of the external device.

10. The electronic device of claim 1, wherein the one or more programs further include instructions for:
receiving, from the external device, information specifying an operating status of the external device; and
in response to determining that the image data includes a representation of the external device, causing the display to display a representation of the operating status of the external device.

11. A non-transitory computer-readable storage medium storing one or more programs configured to be executed by one or more processors of an electronic device, the one or more programs including instructions for:
obtaining, from an external device, information specifying one or more available functions of the external device;
obtaining image data of a physical environment captured by an image sensor, wherein the physical environment includes the external device;
determining that the image data includes a representation of the external device, wherein determining that the image data includes a representation of the external device comprises:
determining, based on the image data, a probability that the image data includes a representation of the external device; and
determining that the probability exceeds a predetermined threshold value; and
in response to determining that the image data includes a representation of the external device, causing a display to concurrently present:
a view of the physical environment; and
a user-activatable virtual object corresponding to a first function of the one or more available functions of the external device, wherein:
the user-activatable virtual object is selected from a plurality of candidate user-activatable virtual objects based on the information specifying the one or more available functions of the external device,
the user-activatable virtual object is displayed overlaying the view of the physical environment, and
detecting user activation of the displayed user-activatable virtual object causes the external device to perform an action corresponding to the first function.

12. The non-transitory computer-readable storage medium of claim 11, wherein the user-activatable virtual object is displayed overlaying the view of the physical environment at a position corresponding to the external device.

13. The non-transitory computer-readable storage medium of claim 11, wherein the one or more programs further include instructions for:
prior to obtaining the information specifying the one or more available functions of the external device, providing an inquiry signal to cause the external device to transmit the information specifying the one or more available functions of the external device.

14. The non-transitory computer-readable storage medium of claim 10, wherein the one or more programs further include instructions for:
prior to obtaining the information specifying the one or more available functions of the external device, establishing a wireless communication connection with the external device.

15. A method comprising:
at an electronic device with a processor and memory:
obtaining, from an external device, information specifying one or more available functions of the external device;
obtaining image data of a physical environment captured by an image sensor, wherein the physical environment includes the external device;
determining that the image data includes a representation of the external device, wherein determining that the image data includes a representation of the external device comprises:

determining, based on the image data, a probability that the image data includes a representation of the external device; and determining that the probability exceeds a predetermined threshold value; and in response to determining that the image data includes a representation of the external device, causing a display to concurrently present:

a view of the physical environment; and a user-activatable virtual object corresponding to a first function of the one or more available functions of the external device, wherein:

the user-activatable virtual object is selected from a plurality of candidate user-activatable virtual objects based on the information specifying the one or more available functions of the external device, the user-activatable virtual object is displayed overlaying the view of the physical environment, and detecting user activation of the displayed user-activatable virtual object causes the external device to perform an action corresponding to the first function.

16. The method of claim 15, wherein the user-activatable virtual object is displayed overlaying the view of the physical environment at a position corresponding to the external device.

17. The method of claim 15, further comprising:

prior to obtaining the information specifying the one or more available functions of the external device, providing an inquiry signal to cause the external device to transmit the information specifying the one or more available functions of the external device.

18. The method of claim 15, further comprising:

prior to obtaining the information specifying the one or more available functions of the external device, establishing a wireless communication connection with the external device.

* * * * *